(12) United States Patent
Cragun et al.

(10) Patent No.: US 7,881,582 B2
(45) Date of Patent: Feb. 1, 2011

(54) SLOWING DISPLAY OF DIGITAL VIDEO

(75) Inventors: Brian J. Cragun, Rochester, MN (US);
Paul R. Day, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1269 days.

(21) Appl. No.: 11/423,646

(22) Filed: Jun. 12, 2006

(65) Prior Publication Data

US 2007/0288971 A1  Dec. 13, 2007

(51) Int. Cl.
*H04N 5/91* (2006.01)
(52) U.S. Cl. .................................. 386/68; 386/95
(58) Field of Classification Search ............ 386/46, 386/68, 95, 98, 125, 126
See application file for complete search history.

(56) References Cited

U.S. PATENT DOCUMENTS

| | | | | |
|---|---|---|---|---|
| 5,457,542 A | * | 10/1995 | Kim | 386/7 |
| 5,768,467 A | * | 6/1998 | Kuboji et al. | 386/68 |
| 5,913,009 A | * | 6/1999 | Kuboji et al. | 386/68 |
| 6,289,168 B2 | * | 9/2001 | Yoshida | 386/68 |

* cited by examiner

*Primary Examiner*—Huy T Nguyen
(74) *Attorney, Agent, or Firm*—Biggers & Ohanian, LLP; James R. Nock

(57) ABSTRACT

Methods, apparatus, and computer program products are disclosed for slowing display of digital video that include receiving in a video display device a digital video stream for display, identifying by the video display device a digital video clip of the digital video stream, the digital video clip comprising consecutive frames characterized by a same digital video text for display, pausing on the display at least one frame of the digital video clip for a pause period.

9 Claims, 13 Drawing Sheets

# SLOWING DISPLAY OF DIGITAL VIDEO

BACKGROUND OF THE INVENTION

1. Field of the Invention

The field of the invention is data processing, or, more specifically, methods, apparatus, and computer program products for slowing display of digital video.

2. Description of Related Art

Often viewers watching a movie or television show in which text is displayed on a display screen have difficulty reading such text. The text may be the text of subtitles, closed captioning, statistics displayed on the screen during a sporting event, the ticker symbols from a financial program, and so on. The difficulty in reading the text may arise from a glare on the display screen caused by an importune light source. Difficulty may also arise from the divided attention of the viewer among the movie or show and other events occurring in the viewing environment such as, for example, children playing or the viewer preparing a meal. Still further, difficulty reading the text may often arise because some viewers simply do not read as fast as the text is displayed.

The current solutions to address the difficulty in reading the text displayed on a display screen include manually pausing, rewinding, or slowing the motion of the movie or television show using a device such as, for example, a DVD player or TiVo®. The drawback to current solutions, however, is that such current solutions require repeated user intervention as the user must manually slow or pause the display of the movie or show.

SUMMARY OF THE INVENTION

Methods, apparatus, and computer program products are disclosed for slowing display of digital video that include receiving in a video display device a digital video stream for display, identifying by the video display device a digital video clip of the digital video stream, the digital video clip comprising consecutive frames characterized by a same digital video text for display, and pausing on the display at least one frame of the digital video clip for a pause period.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Detailed Description

Exemplary methods, systems, and products for slowing display of digital video according to embodiments of the present invention are described with reference to the accompanying drawings. Embodiments of the present invention generally are implemented as data processing systems that include automated computing machinery. For simplicity, however, and because such data processing systems with automated computing machinery will often in fact comprise video display devices of one form or another, this specification refers generally to implementations of embodiments of the present invention as video display devices or 'VDDs.'

Figure 1:
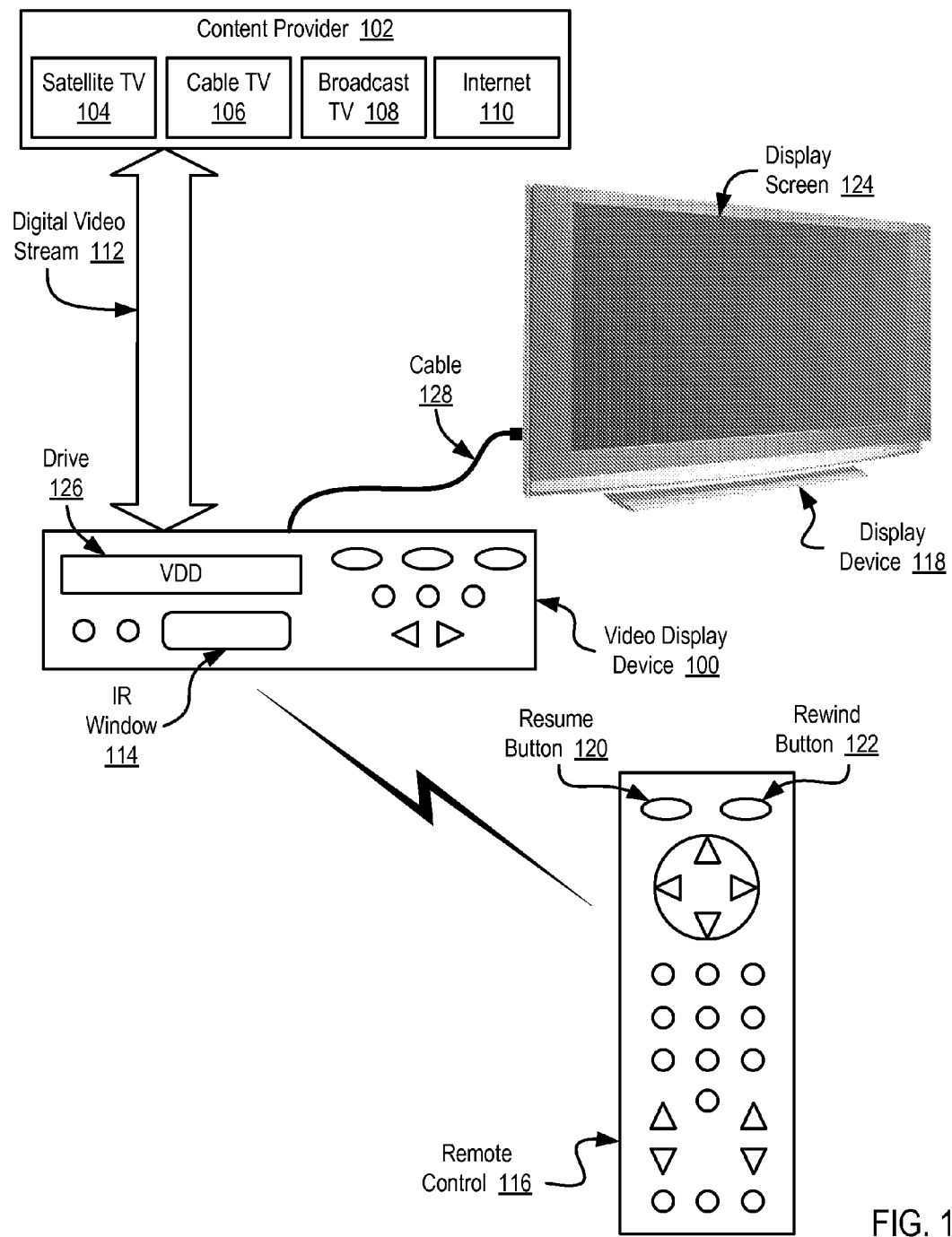
FIG. 1 sets forth a pictorial representation of an exemplary data processing system for slowing display of digital video according to embodiments of the present invention.

Turning now to FIG. 1, FIG. 1 sets forth a pictorial representation of an exemplary data processing system for slowing display of digital video according to embodiments of the present invention. The system of FIG. 1 operates generally for slowing display of digital video according to embodiments of the present invention by receiving in a video display device a digital video stream for display, identifying by the video display device a digital video clip of the digital video stream, and pausing on the display at least one frame of the digital video clip for a pause period. The digital video clip includes consecutive frames characterized by a same digital video text for display.

FIG. 1 depicts a typical context of installation of one kind of VDD according to embodiments of the present invention. The video display device (100) of FIG. 1 is a set top box, similar in size and shape to a cable television box, a DVD player, or a video cassette recorder ('VCR'). The VDD (100) of FIG. 1 is connected by cable (128) to a display device (118). The VDD (100) connects to the display device (118) for display on the display screen (124) of a digital video stream (112) and of operational information of the VDD (100) itself. Although FIG. 1 depicts the display device (118) connected to the video display device (100) by cable (128), such a depiction is for explanation and not for limitation. In some embodiments of the present invention, the functionality and display screen (124) of the display device (118) may be incorporated into the video display device (100) and vice versa.

In the system of FIG. 1, the digital video stream (112) is a collection of frames typically used to create the illusion of a moving picture. The digital video stream (112) may implement a television show, a movie, a commercial, other content, or data associated with such other content. Each frame of the digital video stream (112) is image data for rendering one still image and metadata associated with the image data. The metadata of each frame may include synchronization data for synchronizing the frame with an audio stream, configurational data for devices displaying the frame, digital video text data for displaying textual representations of the audio associated with the frame, and so on.

In the example of FIG. 1, the display device (118) displays each frame of the digital video stream (112). In the terminology of this specification, displaying a frame refers to rendering image data of the frame on the display screen along with any metadata of the frame encoded for display such as, for example, closed captioning text. The display device (118) displays the digital video stream (112) by flashing each frame on the display screen (124) for a brief period of time, typically ¹⁄₂₄th, ¹⁄₂₅th or ¹⁄₃₀th of a second, and then immediately replacing the frame displayed on the display screen with the next frame in the stream (112). As a person views the display screen (124), persistence of vision in the human eye blends the displayed frames together to produce the illusion of a moving image.

In the example of FIG. 1, the frames of the digital video stream (112) of FIG. 1 include digital video text for display on the display screen (124). The digital video text is a set of characters that represents the speech or other audio associated with the images rendered from the frames of the digital video stream (112). Examples of digital video text may include, for example, closed captioning, subtitles, graphical text of the image rendered from the frame, and so on. As the images of the frames are displayed on the display screen (124), the digital video text of the frames is also displayed on the display screen (124). In the case of closed captioning or subtitles, the digital video text is typically displayed to assist hearing-impaired users or non-native speakers of the language of the speech in understanding the audible context of the images. The digital video text associated with a frame may be stored as part of the image data of the frame or stored as metadata of the frame as discussed in more detail below with reference to FIG. 3.

In the example of FIG. 1, the VDD (100) receives the digital video stream (112) from a content provider (102). The content provider (102) may be implemented as a provider of satellite television (104), cable television (106), broadcast television (108), content from the Internet (110), or any other provider of content as will occur to those of skill in the art. In the example of FIG. 1, the VDD (100) may also receive a digital video stream from removable media such as, for example, a DVD or compact disc. In fact, the exemplary VDD (100) depicted in FIG. 1 includes a DVD/compact disc drive (126) supporting such removable media.

The system of FIG. 1 includes a remote control unit (116) that allows users to interact with and control the VDD (100). The remote control unit (116) communicates with the VDD (100) by emitting infrared ('IR') signals representing user instructions. Although the remote control unit (116) emits IR signals, other kinds of remote control emissions are within the scope of the invention, including for example, radio signals. The example VDD (100) includes an IR window (114) for receipt of information and instructions from the remote control unit (116). Functions provided by use of the remote control unit (116) include the ability to move a cursor on the display screen (124), select items shown on the display screen (124), and the ability to input operational data to the VDD (100).

A user operates the remote control unit (116) of FIG. 1 by pressing buttons on the unit (116). The remote control unit (116) of FIG. 1 includes a resume button (120) that a user may operate to send a resume instruction to the VDD (100). A resume instruction is an instruction to resume normal display of a digital video stream after pausing the stream on a frame. The remote control unit (116) of FIG. 1 also includes a rewind button (122) that a user may operate to send a rewind instruction to the VDD (100). A rewind instruction is an instruction to replay a portion of the digital video stream.

The arrangement of devices making up the exemplary system illustrated in FIG. 1 is for explanation, not for limitation. Data processing systems useful according to various embodiments of the present invention may include additional devices and architectures, not shown in FIG. 1, as will occur to those of skill in the art. Various embodiments of the present invention may also be implemented on a variety of hardware platforms in addition to those illustrated in FIG. 1 as will occur to those of skill in the art.

As mentioned above, slowing display of digital video in accordance with the present invention is generally implemented with automated computing machinery comprising video display devices. For further explanation, therefore, FIG. 2 sets forth a block diagram of automated computing machinery comprising an exemplary video display device (100) useful in slowing display of digital video according to embodiments of the present invention. The video display device (100) of FIG. 2 includes at least one computer processor (156) or 'CPU' as well as random access memory (168) ('RAM') which is connected through a system bus (160) to processor (156) and to other components of the video display device (100).

Stored in RAM (168) is a display governor engine (200). The display governor engine (200) is a set of computer program instructions for slowing display of digital video according to embodiments of the present invention. The display governor engine (200) operates generally for slowing display of digital video according to embodiments of the present invention by receiving in a video display device a digital video stream for display, identifying by the video display device a digital video clip of the digital video stream, the digital video clip comprising consecutive frames characterized by a same digital video text for display, and pausing on the display at least one frame of the digital video clip for a pause period.

Also stored in RAM (168) is a digital video stream buffer (202). The digital video stream buffer (202) is a first-in-first-out ('FIFO') buffer for storing the frames of a digital video stream. The digital video stream buffer (202) stores frames of a digital video stream that have not been displayed. In addition, the digital video stream buffer (202) stores a portion of the frames already displayed for rewinding by the VDD the digital video stream to an identified digital video clip for playback.

Also stored in RAM (168) is an operating system (154). Operating systems useful in video display devices according to embodiments of the present invention include UNIX™, Linux™, Microsoft XP™, AIX™, IBM's i5/OS™, and others as will occur to those of skill in the art. The operating system (154), the display governor engine (200), and the digital video stream buffer (202) in the example of FIG. 2 are shown in RAM (168), but many components of such software typically are stored in non-volatile memory (166) also.

Figure 2:
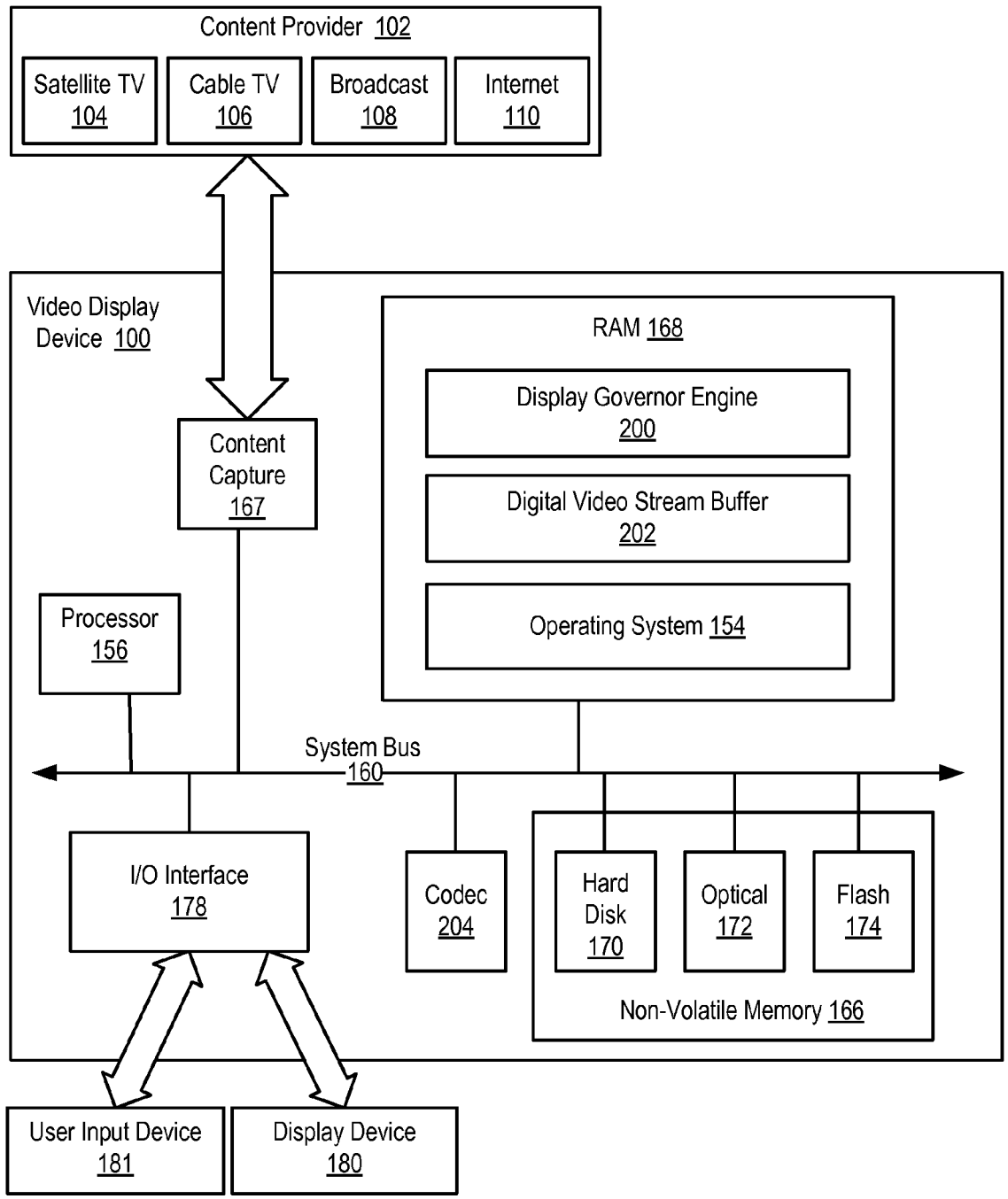
FIG. 2 sets forth a block diagram of automated computing machinery comprising an exemplary video display device useful in slowing display of digital video according to embodiments of the present invention.

The video display device (100) of FIG. 2 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary video display device (100) of FIG. 2 includes a subsystem for content capture (167). The subsystem for content capture (167) is implemented in typical embodiments according to a content provider (102). The subsystem for content capture (167) may include in various embodiments a satellite receiver for receipt of satellite television (104), a cable box for receipt of cable television (106), a broadcast television tuner for receipt of broadcast television (108), and an Internet connection for downloading recordable content from the Internet (110).

The exemplary video display device (100) of FIG. 2 also includes a codec (204). 'Codec' is an industry-standard term referring to 'encoder/decoder.' The codec (204) of FIG. 2 is computer hardware capable of performing encoding and decoding on a digital video stream. The codec (204) of FIG. 2 is useful for encoding a digital video stream for transmission, storage or encryption and decoding the stream for displaying or editing. Although the codec illustrated in FIG. 2 is implemented in computer hardware, such an implementation is for explanation and not for limitation. In fact, a codec may also be implemented in computer software. Examples of codecs useful for slowing the display of digital video according to embodiments of the present invention may include Cinepak, Motion JPEG, MPEG, and any other codecs as will occur to those of skill in the art.

The example video display device (100) of FIG. 2 includes one or more input/output interface adapters (178). Input/output interface adapters in computers implement user-oriented input/output through, for example, software drivers and computer hardware for controlling output to display devices (180) such as, for example, televisions or computer display screens, as well as user input from user input devices (181) such as, for example, remote control units.

Figure 3:
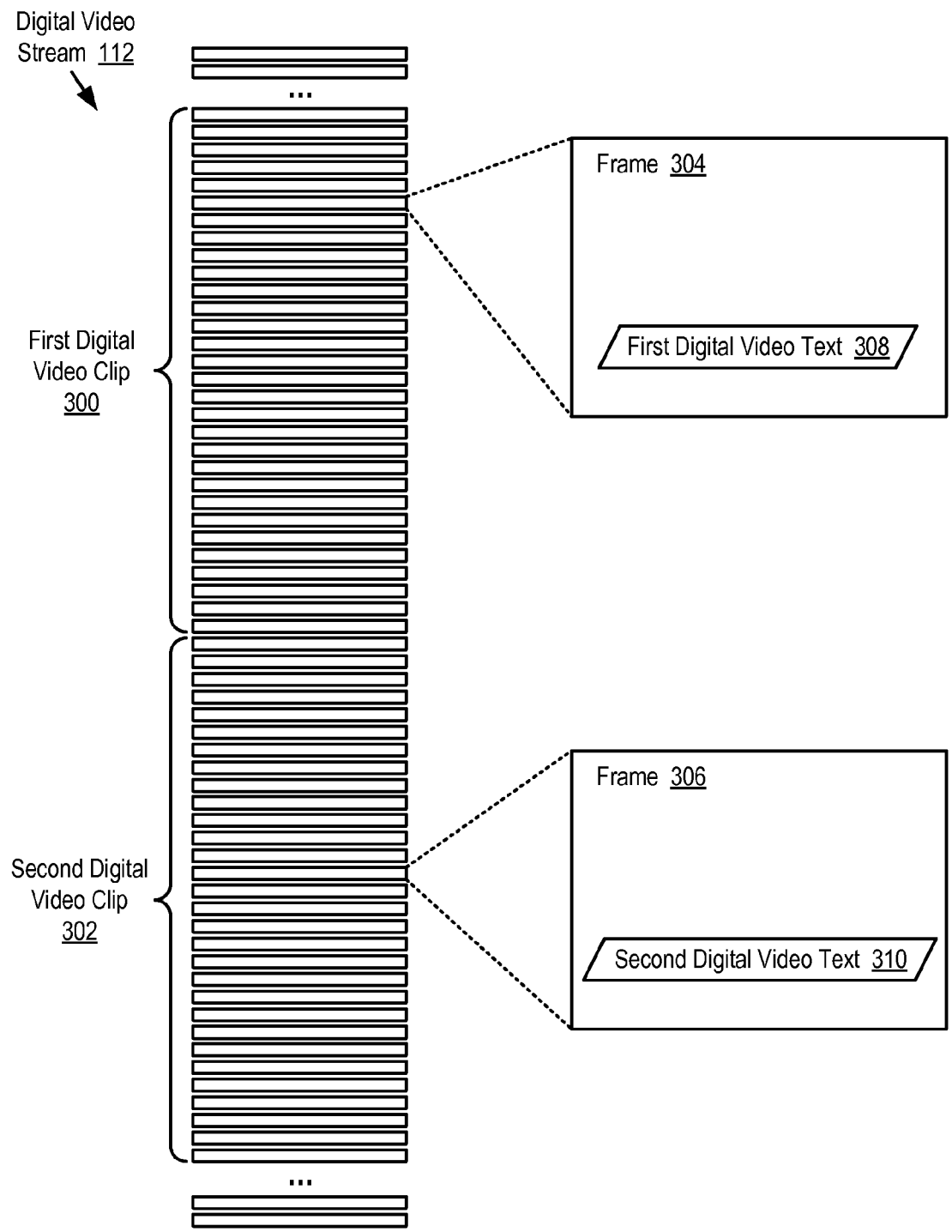
FIG. 3 sets forth a line drawing illustrating a digital video stream including frames characterized by digital video text useful for slowing display of digital video according to embodiments of the present invention.

As mentioned above, the frames of a digital video stream include digital video text for display. For further explanation, therefore, FIG. 3 sets forth a line drawing illustrating a digital video stream (112) including frames characterized by digital video text useful for slowing display of digital video according to embodiments of the present invention. In the example of FIG. 3, the digital video stream (112) includes a first digital video clip (300) and a second digital video clip (302). A digital video clip is a collection of frames characterized by the same digital video text. In the example of FIG. 3, the first digital video clip (300) includes consecutive frames characterized by a same first digital video text (308) for display. That is, all of the frames that make up the first digital video clip (300) include the first digital video text (308) for display. Similarly, the second digital video clip (302) includes consecutive frames characterized by a same second digital video text (310) for display.

For further explanation, consider, for example, a digital video stream having a frame rate of thirty frames per second. A frame rate is the number of consecutive frames flashed on a display screen each second to create the illusion of a moving picture. Consider further that the digital video stream implements a television show in which several people are having a conversation that is displayed at the bottom of a television screen using closed captioning. During the television show, the text "Captain: Fire the torpedoes!" is displayed at the bottom of the television screen for three seconds. Immediately after the three seconds, the text "Ensign: Aye Aye Captain." is displayed at the bottom of the television screen for two seconds. Because the text "Captain: Fire the torpedoes!" is displayed for three seconds, the text "Captain: Fire the torpedoes!" is included in ninety consecutive frames of the digital video stream. The ninety consecutive frames characterized by the text "Captain: Fire the torpedoes!" make up a one digital video clip. Because the text "Ensign: Aye Aye Captain." is displayed for two seconds, the text "Ensign: Aye Aye Captain." characterizes sixty frames of the digital video stream. The sixty consecutive frames characterized by the text "Ensign: Aye Aye Captain." make up a different digital video clip.

As mentioned above, the digital video text associated with a frame may be stored as part of the image data of the frame or stored as metadata of the frame. When the digital video text is stored as part of the image data of a frame, the digital video text is actually embedded as a graphic as part of the still picture flashed on a display when the frame is displayed. That is, the digital video text is stored 'in-band' with the image of the frame. Examples of digital video text stored as part of the image data of a frame may include movie subtitles or text in the scenery of the image of the frame. When the digital video text is stored as metadata of a frame, the digital video text is stored separately from the image data of the frame. For example, closed captioning text is typically stored as metadata of a frame according to the EIA-708 standard developed by the Electronics Industry Alliance ('EIA') and relied upon by the Advanced Television Systems Committee ('ATSC') in helping to develop the new digital television standard for the United States and other countries.

Figure 4:
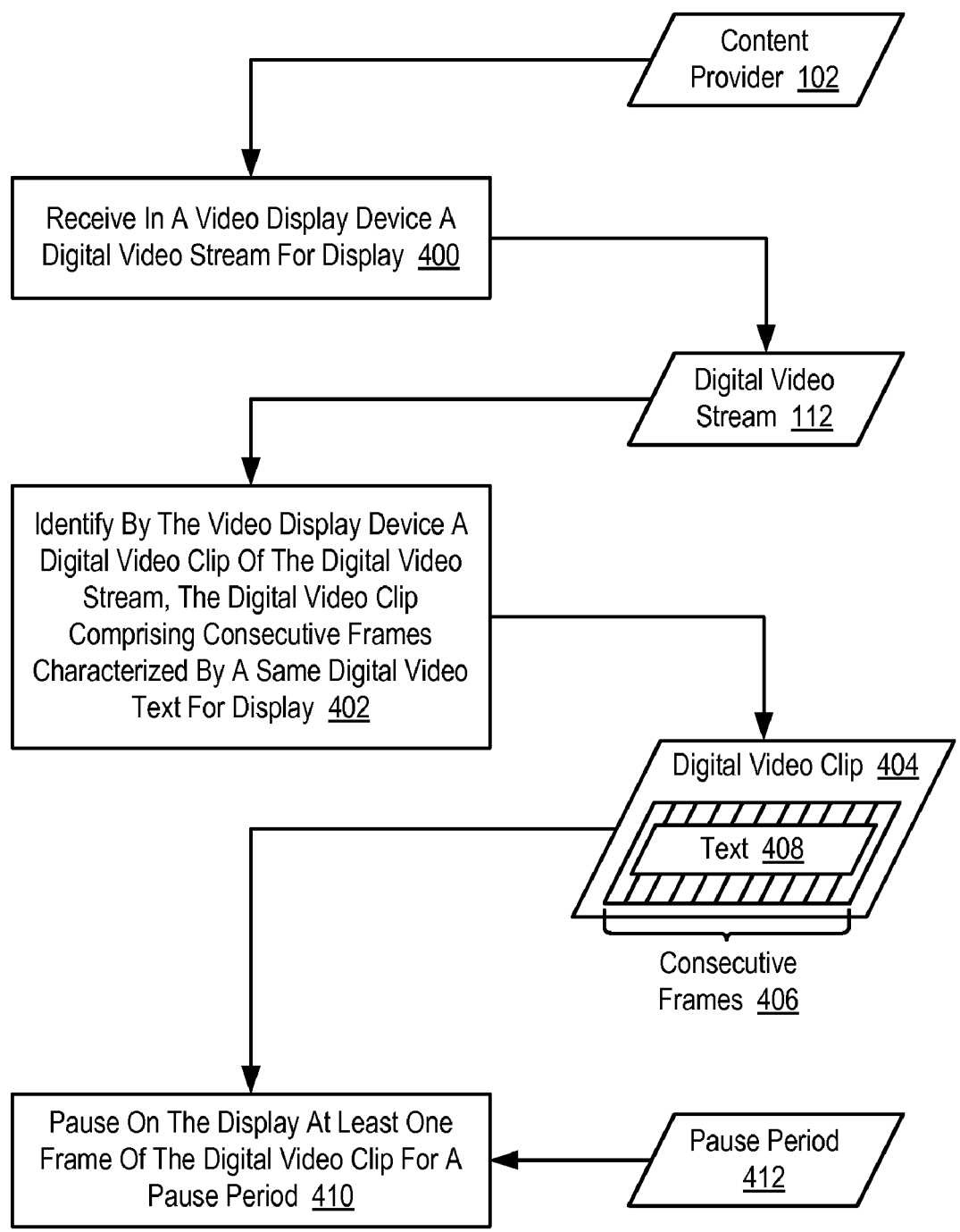
FIG. 4 sets forth a flow chart illustrating an exemplary method for slowing display of digital video according to embodiments of the present invention.

For further explanation, FIG. 4 sets forth a flow chart illustrating an exemplary method for slowing display of digital video according to embodiments of the present invention. The method of FIG. 4 includes receiving (400) in a video display device a digital video stream (112) for display. As mentioned above, the digital video stream (112) is a collection of frames typically used to create the illusion of a moving picture. The example of FIG. 4 includes a content provider (102) that provides video content such as, for example, a television show, a movie, or a commercial, implemented using digital video streams.

In the method of FIG. 4, receiving (400) in a video display device a digital video stream (112) for display may be carried out by receiving the frames of a digital video stream (112) from the content provider and storing the frames for display in a digital video stream buffer. If a content provider (102) only provides an analogue video stream, receiving (400) in a video display device a digital video stream (112) for display according to the method of FIG. 4 may be carried out by digitizing the analogue video stream into the digital video stream (112) and storing the digital video stream (112) in a digital video stream buffer.

The method of FIG. 4 includes identifying (402) by the video display device a digital video clip (404) of the digital video stream (112). The digital video clip (404) including consecutive frames (406) characterized by a same digital video text (408) for display. As mentioned above, all the frames of the digital video clip (404) are consecutive frames from the digital video stream (112) and include the same digital video text (408) for display. Identifying (402) by the video display device a digital video clip (404) of the digital video stream (112) according to the method of FIG. 4 may be carried out by extracting the digital video text from each frame of the digital video stream (112), comparing the digital video text of each frame with the digital video text from the previous frame, and assigning the frame to the same digital video clip as the previous frame if the digital video text of the frame includes the digital video text from the previous frame. If the digital video text of the frame does not include the digital video text from the previous frame, identifying (402) by the video display device a digital video clip (404) of the digital video stream (112) according to the method of FIG. 4 may be carried out by assigning the frame to a new digital video clip. Extracting the digital video text from each frame of the digital video stream (112) may be carried out by retrieving the digital video text from metadata of the frame encoded according to a format such as, for example, the EIA-708 standard, or by retrieving the digital video text from image data of the frame using optical character recognition ('OCR'). Assigning the frame to the same digital video clip as the previous frame may be carried out by associating with the frame the clip identifier associated with the previous frame. Assigning the frame to a new digital video clip may be carried out by associating a new clip identifier with the frame.

The method of FIG. 4 includes pausing (410) on the display at least one frame of the digital video clip (404) for a pause period (412). The pause period (412) is the period of time for which display of the digital video stream is paused on the image of a frame and on any metadata of the frame for display such as, for example, closed captioning text. The pause period (412) may be a fixed period of time such as, for example, two seconds. The pause period (412) may also be a period of time calculated based on some metric such as, for example, the length of the text (408), the speed of the text (408), the display period for the digital video clip (404), the response time for a user to provide a user instruction, and so on.

In the example of FIG. 4, pausing (410) on the display at least one frame of the digital video clip (404) for a pause period (412) may be carried out by repeatedly transmitting for the pause period (412) the same image data and metadata of a frame of the digital video clip (404) for display to a display device such as, for example, a television or a computer display. Instead of merely receiving the information for display, some display devices may have the functionality to retrieve the information for display from a buffer. Pausing (410) on the display at least one frame of the digital video clip (404) for a pause period (412) according to the method of FIG. 4 may, therefore, be carried out by maintaining for display the same image data and metadata of a frame of the digital video clip (404) in a digital video stream buffer. Because the audio associated with the digital video clip requires synchronization with the frame displayed on the display screen, pausing (410) on the display at least one frame of the digital video clip (404) for a pause period (412) may also be carried out by pausing the audio stream for the pause period (412) as well or inserting an audio segment having a length that matches the pause period (412) into the audio stream.

A user of a video display device operating for slowing display of digital video according to embodiments of the present invention may often desire to pause a digital video stream when certain text phrases are displayed on a display screen. For example, a user may desire to pause the digital video stream of a football game when the text phrase "back to pass," "catches the ball," "score," or "touchdown" is displayed. For further explanation, therefore, FIG. 5 sets forth a flow chart illustrating a further exemplary method for slowing display of digital video according to embodiments of the present invention that includes identifying (500) a digital video clip (404) comprising consecutive frames (406) characterized by a text phrase (506) from the list (504).

Figure 5:
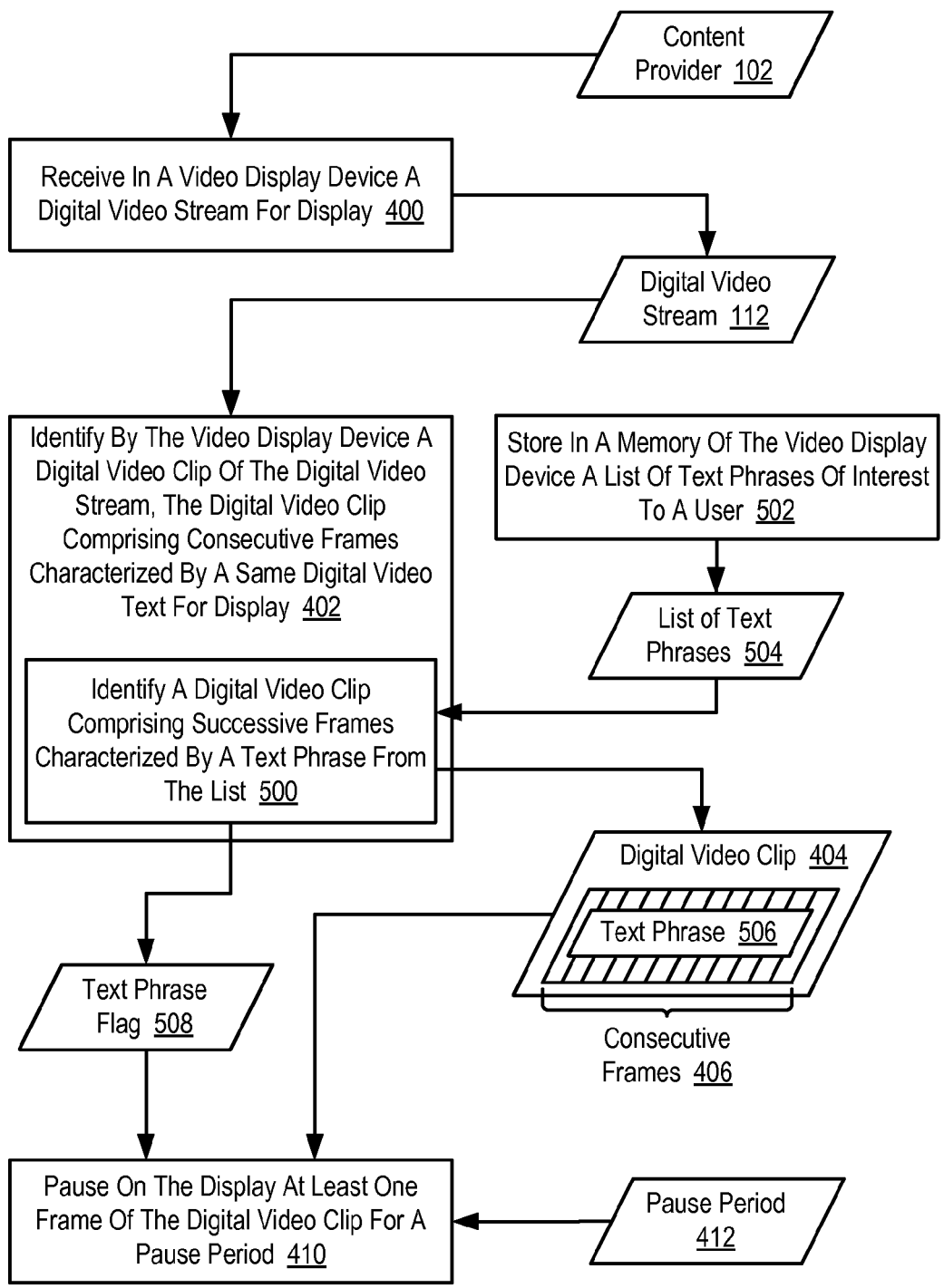
FIG. 5 sets forth a flow chart illustrating a further exemplary method for slowing display of digital video according to embodiments of the present invention.

The method of FIG. 5 is similar to the method of FIG. 4 in that the method of FIG. 5 includes receiving (400) in a video display device a digital video stream (112) for display, identifying (402) by the video display device a digital video clip (404) of the digital video stream (112), and pausing (410) on the display at least one frame of the digital video clip (404) for a pause period (412). The example of FIG. 5 is similar to the example of FIG. 4 in that the example of FIG. 5 also includes content provider (102), digital video stream (112), the digital video clip (404) comprising consecutive frames (406) characterized by a same digital video text (408) for display, and the pause period (412).

The method of FIG. 5 differs from the method of FIG. 4 in that the method of FIG. 5 includes storing (502) in a memory of the video display device a list (504) of text phrases of interest to a user. A text phrase of interest to a user is a set of characters which, when the set of characters is displayed, a user desires to pause the digital video stream on the display. Examples of text phrases of interest to a user may include "back to pass," "catches the ball," "score," "touchdown," and so on. In the method of FIG. 5, storing (502) in a memory of the video display device a list (504) of text phrases of interest to a user may be carried out by receiving a text phrase from a user through an input device such as, for example, a remote control unit or a keyboard.

In the method of FIG. 5, identifying (402) by the video display device a digital video clip (404) of the digital video stream (112) includes identifying (500) a digital video clip (404) comprising consecutive frames (406) characterized by a text phrase (506) from the list (504). Identifying (500) a digital video clip (404) comprising consecutive frames (406) characterized by a text phrase (506) from the list (504) according to the method of FIG. 5 may be carried out by comparing the digital video text of each digital video clip (404) identified according to the method of FIG. 4 with a text phrase (506) in the list (504) of text phrases and setting a text phrase flag (508). The text phrase flag (508) is a flag in computer memory of the video display device that indicates when set that the digital video clip (404) includes consecutive frames (406) characterized by a text phrase from the list (504).

In the method of FIG. 5, pausing (410) on the display at least one frame of the digital video clip (404) for a pause period (412) may be carried out by retrieving the value of the text phrase flag (508) and pausing on the display at least one frame of the digital video clip (404) for a pause period (412) if the text phrase flag (508) is set. Pausing (410) on the display at least one frame of the digital video clip (404) for a pause period (412) according to the method of FIG. 5 advantageously slows the display of digital video when user-defined text phrases appear on the screen.

As mentioned above, a pause period may be a period of time calculated based on a metric such as, for example, the length of the digital video text. For further explanation, therefore, FIG. 6 sets forth a flow chart illustrating a further exemplary method for slowing display of digital video according to embodiments of the present invention that includes calculating (608) the pause period (412) in dependence upon the length (606) of the digital video text.

Figure 6:
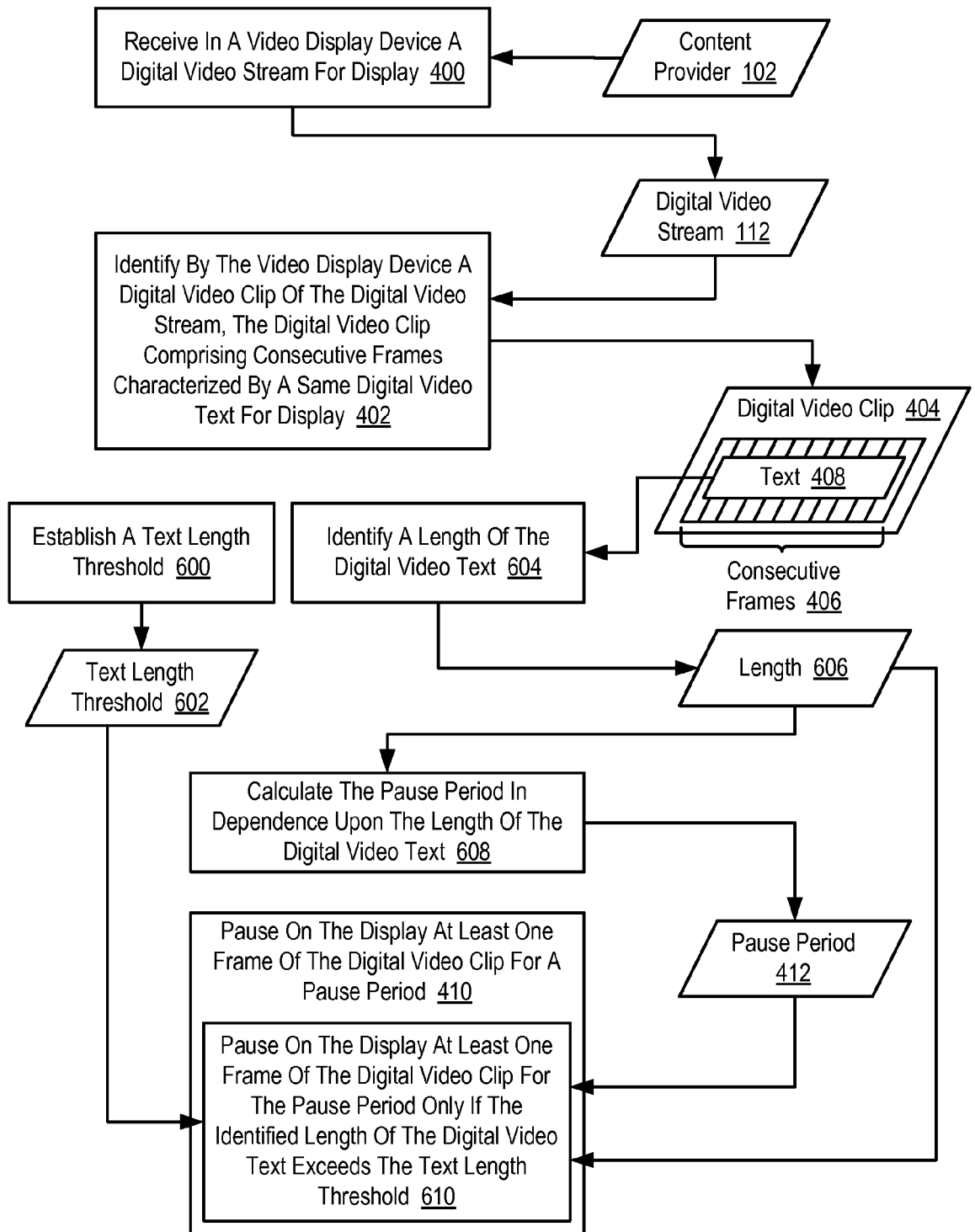
FIG. 6 sets forth a flow chart illustrating a further exemplary method for slowing display of digital video according to embodiments of the present invention.

The method of FIG. 6 is similar to the method of FIG. 4 in that the method of FIG. 6 includes receiving (400) in a video display device a digital video stream (112) for display, identifying (402) by the video display device a digital video clip (404) of the digital video stream (112), and pausing (410) on the display at least one frame of the digital video clip (404) for a pause period (412). The example of FIG. 6 is similar to the example of FIG. 4 in that the example of FIG. 6 also includes content provider (102), digital video stream (112), the digital video clip (404) comprising consecutive frames (406) characterized by a same digital video text (408) for display, and the pause period (412).

The method of FIG. 6 differs from the method of FIG. 4 in that the method of FIG. 6 includes identifying (604) a length (606) of the digital video text (408). The length (606) of the digital video text (408) is the quantity of the text for display. The length (606) of the digital video text (408) may be measured in units of characters of text, words of text, lines of text, and so on. In the method of FIG. 6, identifying (604) a length (606) of the digital video text (408) may be carried out by counting the number of characters of the digital video text (408) for last frame of the digital video clip (404), counting the number of words of the digital video text (408) for last frame of the digital video clip (404), counting the number of lines of the digital video text (408) for last frame of the digital video clip (404), or any other method of identifying (604) a length (606) of the digital video text (408) as will occur to one of skill in the art.

The method of FIG. 6 also includes calculating (608) the pause period (412) in dependence upon the length (606) of the digital video text. Calculating (608) the pause period (412) in dependence upon the length (606) of the digital video text may be carried out by calculating pause period (412) as the length (606) of the digital video text times a rate at which an average user reads digital video text. Consider, for example, digital video clip having a length of text of fifty characters and twenty characters per second is the rate at which an average user may read the digital video text (408). Calculating pause period (412) as the length (606) of the digital video text times a rate at which an average user reads digital video text may be carried out, for example, as follows:

$$T = L \div R = 50 \text{ characters} \div 20 \text{ characters per second} = 2.5 \text{ seconds}$$

where T is the pause period (412), L is the length (606) of the digital video text (408), and R is the rate at which an average user may read the digital video text (408). Readers will note that the exemplary calculation above is for explanation only and not for limitation. In fact, calculating (608) the pause period (412) in dependence upon the length (606) of the digital video text may be carried out in other ways as will occur to those of skill in the art.

The method of FIG. 6 also includes establishing (600) a text length threshold (602). The text length threshold (602) is a threshold quantity of digital video text for determining whether to pause the digital video stream on the display. For digital video texts having a length (606) greater than the text length threshold (602), a user may need a video display device to pause the digital video stream in order to give the user time to read the digital video text. For digital video texts having a length (606) less than the text length threshold (602), the time required to display all of the frames of the digital video clip (404) may provide enough time for the user to read all of the digital video text (408). In the example of FIG. 6, establishing (600) a text length threshold (602) may be carried out by receiving the text length threshold (602) from a user through an input device such as, for example, a keyboard or remote control unit.

In the method of FIG. 6, pausing (410) on the display at least one frame of the digital video clip (404) for a pause period (412) includes pausing (610) on the display at least one frame of the digital video clip for the pause period (412) only if the identified length (606) of the digital video text exceeds the text length threshold (602). Pausing (610) on the display at least one frame of the digital video clip for the pause period (412) only if the identified length (606) of the digital video text exceeds the text length threshold (602) according to the example of FIG. 6 may be carried out by comparing the length (606) of the digital video text with the text length threshold (602). Pausing (610) on the display at least one frame of the digital video clip for the pause period (412) only if the identified length (606) of the digital video text exceeds the text length threshold (602) according to the method of FIG. 6 advantageously slows the display of digital video when large quantities of text appear on the display.

As mentioned above, a pause period may be a period of time calculated based on a metric such as, for example, the text speed of a digital video clip. For further explanation, therefore, FIG. 7 sets forth a flow chart illustrating a further exemplary method for slowing display of digital video according to embodiments of the present invention that includes calculating (708) the pause period (412) in dependence upon the text speed (706) of the digital video clip (404).

Figure 7:
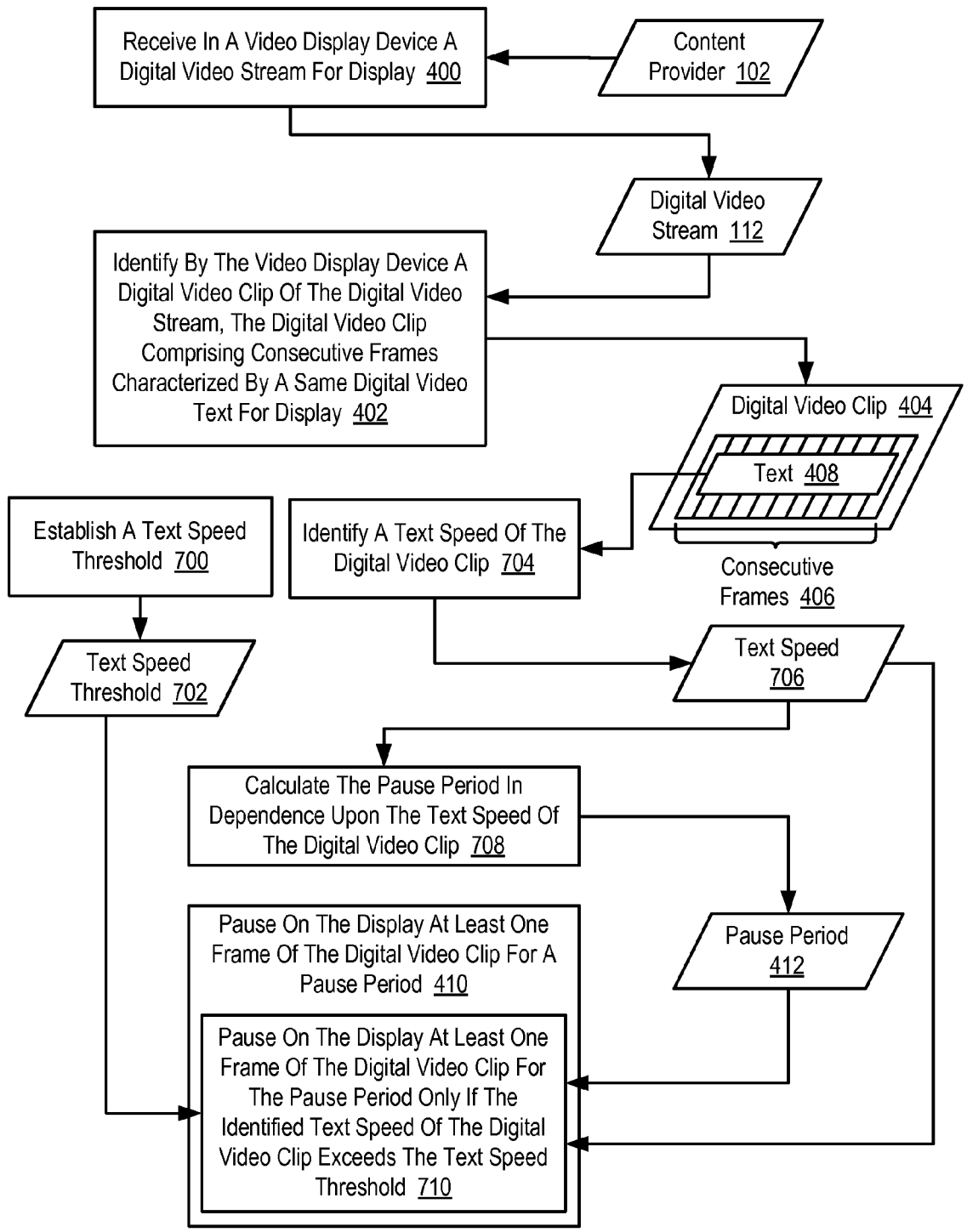
FIG. 7 sets forth a flow chart illustrating a further exemplary method for slowing display of digital video according to embodiments of the present invention.

The method of FIG. 7 is similar to the method of FIG. 4 in that the method of FIG. 7 includes receiving (400) in a video display device a digital video stream (112) for display, identifying (402) by the video display device a digital video clip (404) of the digital video stream (112), and pausing (410) on the display at least one frame of the digital video clip (404) for a pause period (412). The example of FIG. 7 is similar to the example of FIG. 4 in that the example of FIG. 7 also includes content provider (102), digital video stream (112), the digital video clip (404) comprising consecutive frames (406) characterized by a same digital video text (408) for display, and the pause period (412).

The method of FIG. 7 differs from the method of FIG. 4 in that the method of FIG. 7 includes identifying (704) a text speed (706) of the digital video clip (404). The text speed (706) of the digital video clip (404) is the rate at which the digital video text (408) is displayed for a digital video clip (404). The text speed (706) may be measured in units of characters per second, characters per frame, words per second, lines per frame, and so on. In the method of FIG. 7, identifying (704) a text speed (706) of the digital video clip (404) may be carried out by identifying a length of the digital video text according to the method of FIG. 6 and identifying the number of frames (406) in the digital video clip (404). Identifying (704) a text speed (706) of the digital video clip (404) according to the method of FIG. 7 may further be carried out by calculating the text speed (706) in dependence upon the length of the digital video text and the number of frames (406) in the digital video clip (404).

Consider, for example, a digital video clip having a length of text of fifty characters, having thirty frames, and a frame rate of thirty frames per second. Calculating the text speed (706) in dependence upon the length of the digital video text and the number of frames (406) in the digital video clip (404) may be carried out, for example, as follows:

$$S = L \div F * N = 50 \text{ characters} \div 30 \text{ frames} * 30 \text{ frames per second} = 50 \text{ characters per second}$$

where S is the text speed (706) of the digital video clip (404), L is the length of the digital video text (408), F is the number of frames in the digital video clip (404), and N is the frame rate of the digital video stream (112). Readers will note that the exemplary calculation above is for explanation only and not for limitation. In fact, calculating the text speed (706) of the digital video clip (404) may be carried out in other ways as will occur to those of skill in the art.

The method of FIG. 7 includes calculating (708) the pause period (412) in dependence upon the text speed (706) of the digital video clip (404). Continuing with the previous example in which the digital video clip has a text speed of fifty characters per second, consider that twenty characters per second is the rate at which an average reader may read the digital video text (408). Calculating (708) the pause period (412) in dependence upon the text speed (706) of the digital video clip (404) according to the method of FIG. 7 may be carried out, for example, as follows:

$T=S \div R*F \div N = 50$ characters per second÷20 characters per second*30 frames÷30 frames per second=2.5 seconds where T is the pause period (412), S is the text speed (706) of the digital video clip (404), R is the rate at which an average user may read the digital video text (408), F is the number of frames in the digital video clip (404), and N is the frame rate of the digital video stream (112). Readers will note that the exemplary calculation above is for explanation only and not for limitation. In fact, calculating (708) the pause period (412) in dependence upon the text speed (706) of the digital video clip (404) may be carried out in other ways as will occur to those of skill in the art.

The method of FIG. 7 includes establishing (700) a text speed threshold (702). The text speed threshold (702) is a threshold rate of text speed for determining whether to pause the digital video stream on the display. For digital video clips having a text speed greater than the text speed threshold (702), a user may need a video display device to pause the digital video stream in order to give the user time to read the digital video text. For digital video clips having a text speed (706) less than the text speed threshold (702), the time required to display all of the frames of the digital video clip (404) may provide enough time for the user to read all of the digital video text (408). In the example of FIG. 7, establishing (700) a text speed threshold (702) may be carried out by receiving the text speed threshold (702) from a user through an input device such as, for example, a keyboard or remote control unit.

In the method of FIG. 7, pausing (410) on the display at least one frame of the digital video clip (404) for a pause period (412) includes pausing (710) on the display at least one frame of the digital video clip for the pause period (412) only if the identified text speed (706) of the digital video clip (404) exceeds the text speed threshold (702). Pausing (710) on the display at least one frame of the digital video clip for the pause period (412) only if the identified text speed (706) of the digital video clip (404) exceeds the text speed threshold (702) according to the example of FIG. 7 may be carried out by comparing the text speed (706) of the digital video clip (404) with the text speed threshold (702). Pausing (710) on the display at least one frame of the digital video clip for the pause period (412) only if the identified text speed (706) of the digital video clip (404) exceeds the text speed threshold (702) according to the method of FIG. 7 advantageously slows the display of digital video when the dialogue accompanying the digital video speeds up.

As mentioned above, a pause period may be a period of time calculated based on a metric such as, for example, the display period of a digital video clip. For further explanation, therefore, FIG. 8 sets forth a flow chart illustrating a further exemplary method for slowing display of digital video according to embodiments of the present invention that includes calculating (804) the pause period (412) in dependence upon the display period (802).

Figure 8:
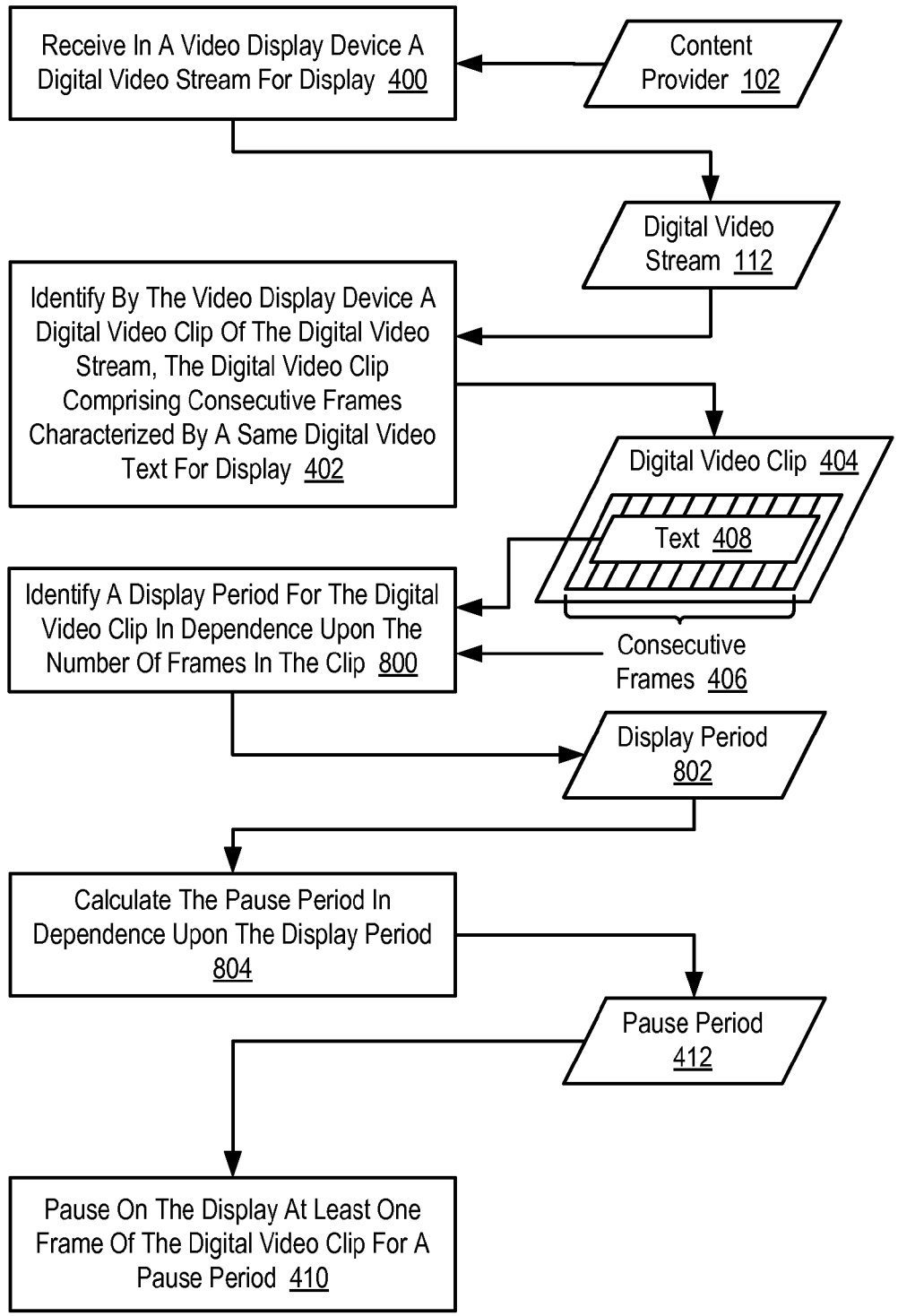
FIG. 8 sets forth a flow chart illustrating a further exemplary method for slowing display of digital video according to embodiments of the present invention.

The method of FIG. 8 is similar to the method of FIG. 4 in that the method of FIG. 8 includes receiving (400) in a video display device a digital video stream (112) for display, identifying (402) by the video display device a digital video clip (404) of the digital video stream (112), and pausing (410) on the display at least one frame of the digital video clip (404) for a pause period (412). The example of FIG. 8 is similar to the example of FIG. 4 in that the example of FIG. 8 also includes content provider (102), digital video stream (112), the digital video clip (404) comprising consecutive frames (406) characterized by a same digital video text (408) for display, and the pause period (412).

The method of FIG. 8 differs from the method of FIG. 4 in that the method of FIG. 8 includes identifying (800) a display period (802) for the digital video clip (404) in dependence upon the number of frames (406) in the clip (404). A display period (802) is the period of time taken to display the frames of a digital video clip at a particular frame rate. Identifying (800) a display period (802) for the digital video clip (404) in dependence upon the number of frames (406) in the clip (404) according to the method of FIG. 8 may be carried out by calculating the display period (802) in dependence upon the number of frames (406) in the clip (404) and the frame rate of the clip (404). Consider, for example, a digital video clip having sixty frames and displayed at a frame rate of thirty frames per second. Calculating the display period (802) in dependence upon the number of frames (406) in the clip (404) and the frame rate of the clip (404) according to the example of FIG. 8 may be carried out, for example, as follows:

$P=F \div N=60$ frames÷30 frames per second=2 seconds where P is the display period (802), F is the number of frames in the digital video clip (404), and N is the frame rate of the digital video stream (112). Readers will note that the calculation described above is an exemplary calculation for explanation only and not for limitation.

The method of FIG. 8 also includes calculating (804) the pause period (412) in dependence upon the display period (802). Continuing with the example above in which a display period of two seconds is identified for a digital video clip, consider further that a display video device pauses on a frame of a digital video clip for ten percent of the display period of the digital video clip. Calculating (804) the pause period (412) in dependence upon the display period (802) may be carried out, for example, as follows:

$T=P*C=2$ seconds*10 percent=2.2 seconds where T is the pause period (412), P is the display period (802), and C is the percent of the display period (802) that a display video device pauses on a frame of a digital video clip. Readers will note that the exemplary calculation above is for explanation only and not for limitation. In fact, calculating (804) the pause period (412) in dependence upon the display period (802) may be carried out in other ways as will occur to those of skill in the art. Calculating (804) the pause period (412) in dependence upon the display period (802) according the method of FIG. 8 advantageously pauses the display of a frame from a longer digital video clip for a time period longer than a frame from a shorter digital video clip.

Digital video text implemented as closed caption text or subtitles is often abbreviated or truncated because the rapid nature of the dialogue does not provide a user with the time required to read a complete, more verbose version of the text. A user utilizing a video display device operating for slowing the display of digital video according to embodiments of the present invention, however, has all the time the user needs to read such digital video text displayed on a display screen.

Content providers may, therefore, encode the frames of a digital video stream with an additional, more verbose set of digital video text for the benefit of users having a video display device operating according to embodiments of the present invention. For further explanation, therefore, FIG. 9 sets forth a flow chart illustrating a further exemplary method for slowing display of digital video according to embodiments of the present invention that includes a digital video stream (112) that includes frames (900) having more than one set of digital video text available for display. The sets of digital video text vary in verbosity.

Figure 9:
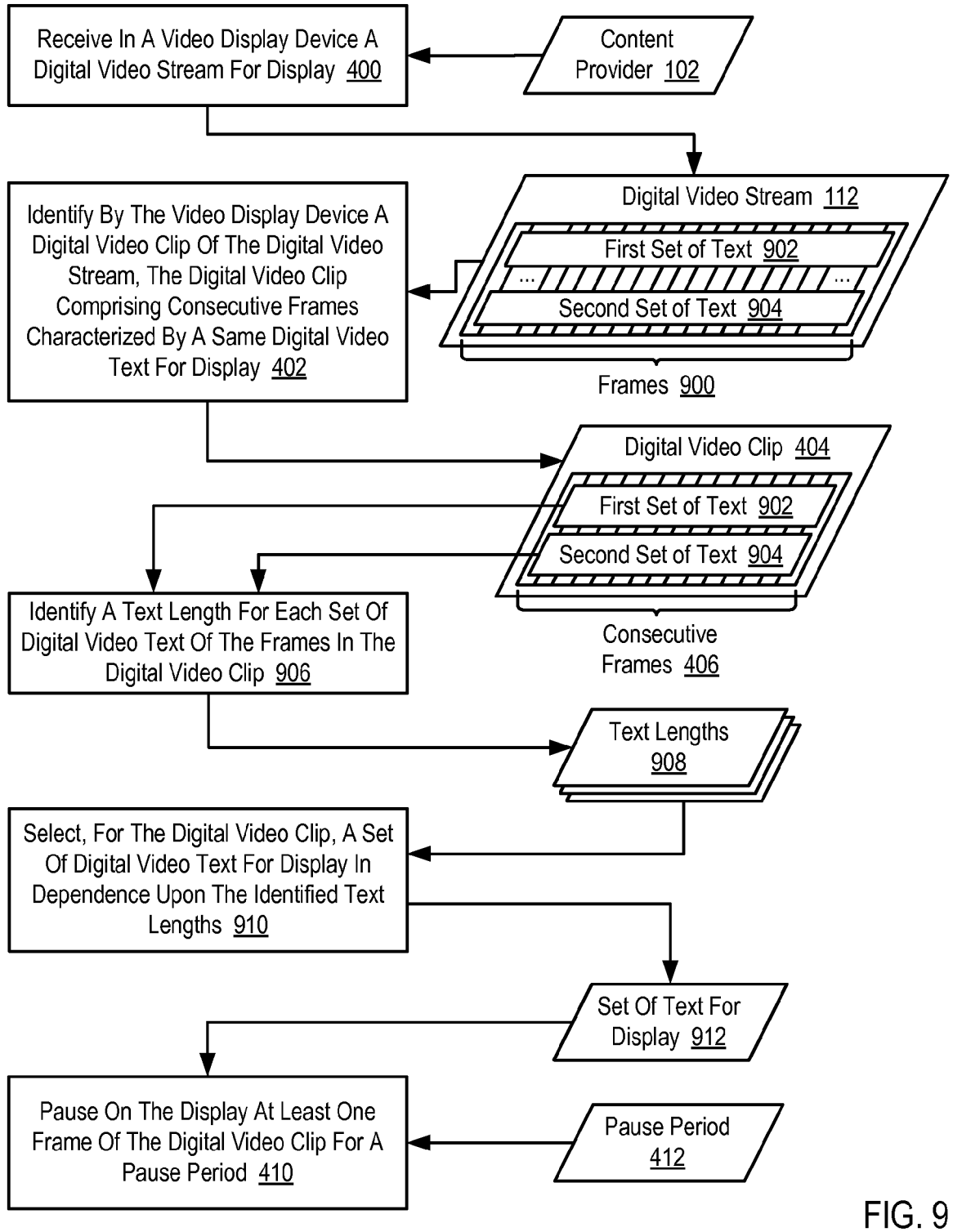
FIG. 9 sets forth a flow chart illustrating a further exemplary method for slowing display of digital video according to embodiments of the present invention.

The method of FIG. 9 is similar to the method of FIG. 4 in that the method of FIG. 9 includes receiving (400) in a video display device a digital video stream (112) for display, identifying (402) by the video display device a digital video clip (404) of the digital video stream (112), and pausing (410) on the display at least one frame of the digital video clip (404) for a pause period (412). The example of FIG. 9 is similar to the example of FIG. 4 in that the example of FIG. 9 also includes content provider (102), digital video stream (112), the digital video clip (404) comprising consecutive frames (406) characterized by a same digital video text (408) for display, and the pause period (412).

The example of FIG. 9 differs from the example of FIG. 4 in that the digital video stream (112) of FIG. 9 includes frames (900). The frames (900) of FIG. 9 have a first set of text (902) and a second set of text (904). In the example of FIG. 9, the first set of text (902) and the second set of text (904) vary in verbosity.

The method of FIG. 9 also includes identifying (906) a text length (908) for each set (902, 904) of digital video text of the frames (406) in the digital video clip (404). The text length (908) is the quantity of the text for display. The length (908) of each set (902, 904) of digital video text may be measured using characters of text, words of text, lines of text, and so on. Identifying (906) a text length (908) for each set (902, 904) of digital video text of the frames (406) in the digital video clip (404) may be carried out by identifying the length of the digital video text for each set (902, 904) as described above with reference to FIG. 6.

The method of FIG. 9 also includes selecting (910), for the digital video clip (404), a set (912) of digital video text for display in dependence upon the identified text lengths (908). Selecting (910), for the digital video clip (404), a set (912) of digital video text for display in dependence upon the identified text lengths (908) according to the method of FIG. 9 may be carried out by comparing the identified text lengths (908) for each set (902, 904) and selecting (910), for the digital video clip (404), the set (902, 904) of digital video text for display having the largest identified text length (908). Selecting (910), for the digital video clip (404), a set (912) of digital video text for display in dependence upon the identified text lengths (908) advantageously allows for the display of the more verbose set of digital video text when slowing the display of a digital video clip according to embodiments of the present invention.

As mentioned above, a pause period may be a period of time calculated based on a metric such as, for example, the response time for a user to provide a user instruction. For further explanation, therefore, FIG. 10 sets forth a flow chart illustrating a further exemplary method for slowing display of digital video according to embodiments of the present invention that includes pausing (1004) until the resume instruction (1002) is received by the video display device.

Figure 10:
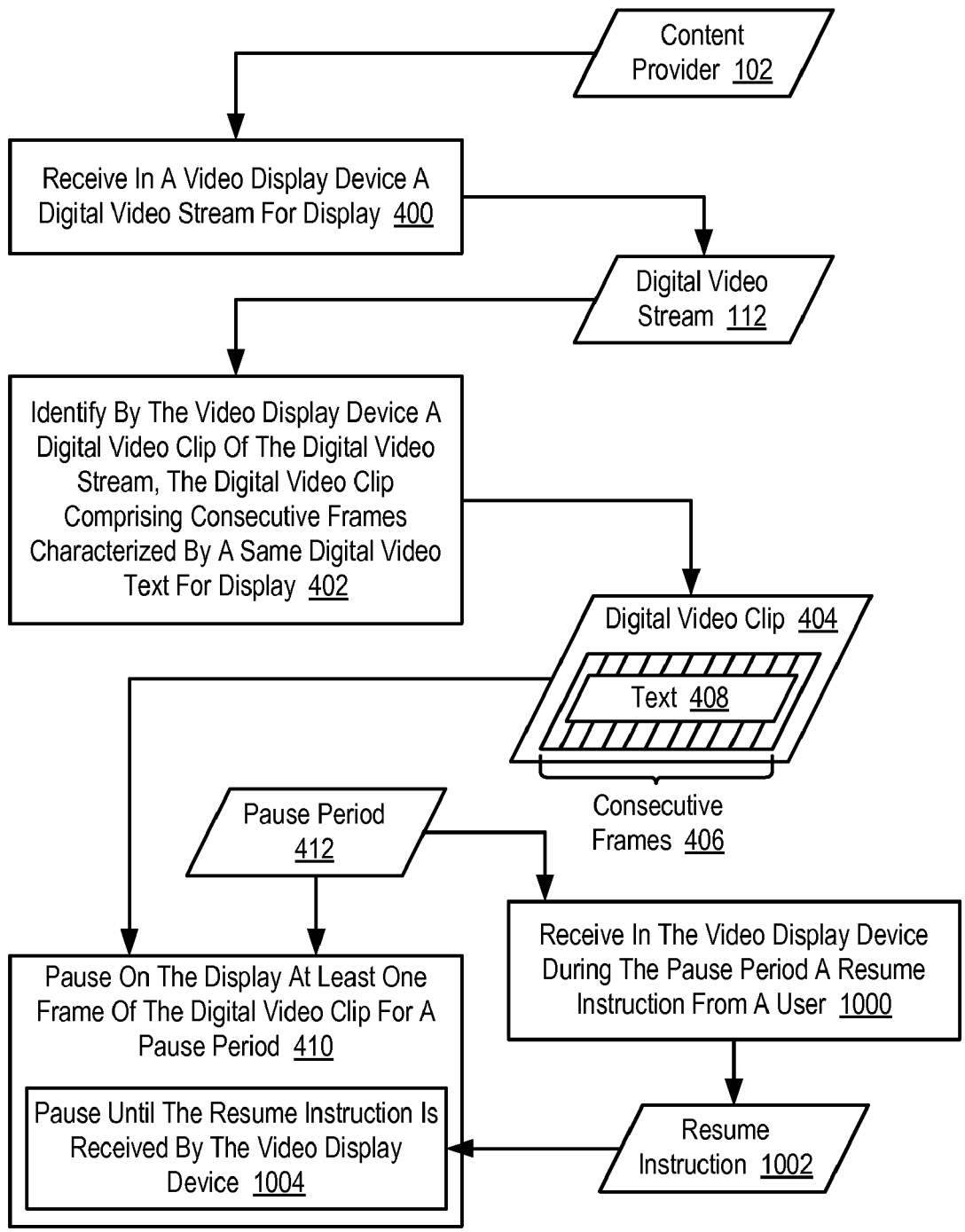
FIG. 10 sets forth a flow chart illustrating a further exemplary method for slowing display of digital video according to embodiments of the present invention.

The method of FIG. 10 is similar to the method of FIG. 4 in that the method of FIG. 10 includes receiving (400) in a video display device a digital video stream (112) for display, identifying (402) by the video display device a digital video clip (404) of the digital video stream (112), and pausing (410) on the display at least one frame of the digital video clip (404) for a pause period (412). The example of FIG. 10 is similar to the example of FIG. 4 in that the example of FIG. 10 also includes content provider (102), digital video stream (112), the digital video clip (404) comprising consecutive frames (406) characterized by a same digital video text (408) for display, and the pause period (412).

The method of FIG. 10 differs from the method of FIG. 4 in that the method of FIG. 10 includes receiving (1000) in the video display device during the pause period (412) a resume instruction (1002) from a user. The resume instruction (1002) represents an instruction from a user to resume normal display of the frames of a digital video stream according to a particular frame rate. Receiving (1000) in the video display device during the pause period (412) a resume instruction (1002) from a user according to the method of FIG. 10 may be carried out by receiving (1000) a resume instruction (1002) from a user input device such as, for example, a remote control unit or keyboard.

In the method of FIG. 10, pausing (410) on the display at least one frame of the digital video clip (404) for a pause period (412) includes pausing (1004) until the resume instruction (1002) is received by the video display device. Pausing (1004) until the resume instruction (1002) is received by the video display device advantageously slows the display of a digital video for a time period determined by the user.

As a video display device operates for slowing the display of digital video according to embodiments of the present invention by pausing until a resume instruction is received by the video display device, the video display device may maintain a history of how long the video display device pauses for each digital video clip. A video display device pausing until a resume instruction is received by the video display device may, therefore, be referred to as in a 'learning mode.' Over time, pausing (1004) until the resume instruction (1002) is received by the video display device according to the method of FIG. 7 allows for the accumulation of a pause length history that may be utilized to calculate future pause periods when the video display device no longer operates in the learning mode. For further explanation, therefore, FIG. 11 sets forth a flow chart illustrating a further exemplary method for slowing display of digital video according to embodiments of the present invention that includes calculating (1108) the pause period (412) in dependence upon a pause length history (1110).

Figure 11:
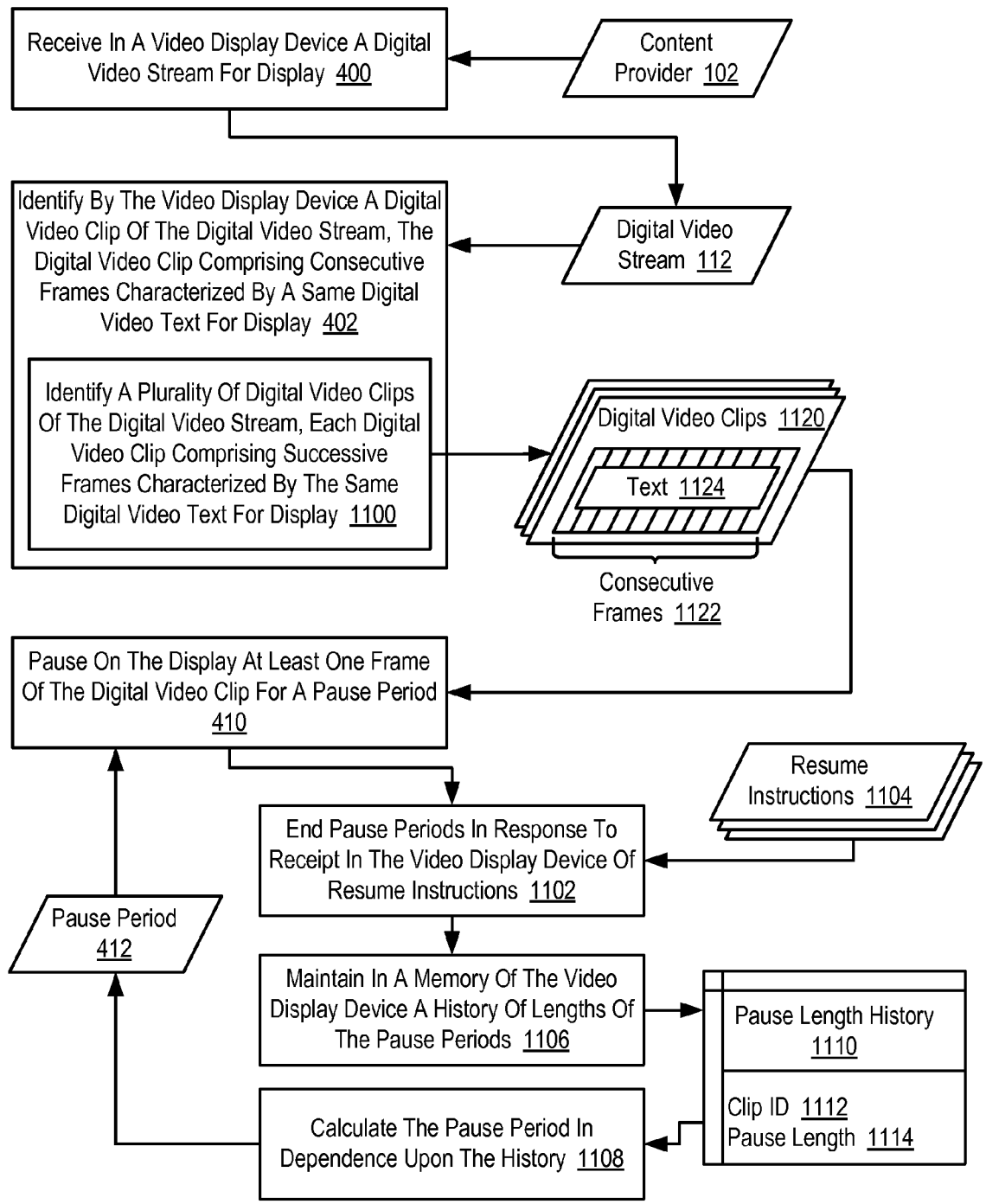
FIG. 11 sets forth a flow chart illustrating a further exemplary method for slowing display of digital video according to embodiments of the present invention.

The method of FIG. 11 is similar to the method of FIG. 4 in that the method of FIG. 11 includes receiving (400) in a video display device a digital video stream (112) for display, identifying (402) by the video display device a digital video clip (404) of the digital video stream (112), and pausing (410) on the display at least one frame of the digital video clip (404) for a pause period (412). The example of FIG. 11 is similar to the example of FIG. 4 in that the example of FIG. 11 also includes content provider (102), digital video stream (112), and the pause period (412).

The method of FIG. 11 differs from the method of FIG. 4 in that identifying (402) by the video display device a digital video clip of the digital video stream (112) according to the method of FIG. 11 includes identifying (1100) a plurality of digital video clips (1120) of the digital video stream (112). Each digital video clip (1120) includes consecutive frames (1122) characterized by the same digital video text (1124) for display. Identifying (1100) a plurality of digital video clips (1120) of the digital video stream (112) according to the method of FIG. 11 may be carried out by identifying by the video display device a digital video clip of the digital video stream (112) as discussed above with reference to FIG. 4.

The method of FIG. 11 also includes ending (1102) pause periods in response to receipt in the video display device of resume instructions (1104). The resume instructions (1104) represent instructions from users to resume normal display of the frame of the digital video stream according to a particular frame rate. Ending (1102) pause periods in response to receipt in the video display device of resume instructions (1104) according to the method of FIG. 11 may be carried out by pausing until the resume instruction is received by the video display device as described above with reference to FIG. 10.

The method of FIG. 11 also includes maintaining (1106) in a memory of the video display device a history (1110) of lengths of the pause periods. The pause length history (1110) is a table that associates a clip identifier (1112) with a pause length (1114). Each record of the pause length history (1110) table represents the pause length for a previously displayed digital video clip paused until the video display device received a resume instruction. The clip identifier (1112) specifies the particular digital video clip having a frame paused on a display. The pause length (1114) specifies the period of time for which display of the digital video stream is paused on a particular frame. In the method of FIG. 11, maintaining (1106) in a memory of the video display device a history (1110) of lengths of the pause periods may be carried out by associating, for each pause period ended in response to receipt in the video display device of a resume instruction (1004), an identifier for the clip that includes the frame on which the display is paused and the pause length.

At some point during the operation of the video display device, a user may switch the video display device out of learning mode so that the video display device calculates the pause periods based on a the history (1110) of lengths of pause periods instead of the calculating the pause period based on the receipt of a resume instruction. The method of FIG. 11, therefore, also includes calculating (1108) the pause period (412) in dependence upon the history (1110). Calculating (1108) the pause period (412) in dependence upon the history (1110) may be carried out by calculating the pause period (412) as the average pause length (1114) for some number of digital video clips in the pause length history table (1110), calculating the pause period (412) as the weighted average pause length (1114) for some number of digital video clips in the pause length history table (1110), or calculating the pause period (412) in dependence upon the history (1110) in any other way as will occur to one skilled in the art.

Consider, for example, a pause length history table representing that the pause length for the last five digital video clips was three seconds, four seconds, five seconds, three seconds, and four seconds. Calculating the pause period (412) as the average pause length (1114) for some number of digital video clips in the pause length history table (1110) may be carried out, for example, as follows:

$$T=(H_1+H_2+H_3+H_4+H_5) \div I=(3 \text{ seconds}+4 \text{ seconds}+5 \text{ seconds}+3 \text{ seconds}+5 \text{ seconds}) \div 5 = 4 \text{ seconds}$$

where T is the pause period (412), $H_1$ is the pause length associated with the digital video clip one clip before the current clip being displayed, $H_2$ is the pause length associated with the digital video clip two clips before the current clip being displayed, $H_3$ is the pause length associated with the digital video clip three clips before the current clip being displayed, $H_4$ is the pause length associated with the digital video clip three clips before the current clip being displayed, $H_5$ is the pause length associated with the digital video clip five clips before the current clip being displayed, and I is the number of digital video clips associated with pause lengths used in the calculation. Readers will note that the exemplary calculation above is for explanation only and not for limitation. As mentioned above, calculating (1108) the pause period (412) in dependence upon the history (1110) may be carried out in other ways as will occur to those of skill in the art.

As mentioned above with reference to FIG. 11, a video display device may accumulate a pause length history while in a learning mode that may be utilized to calculate future pause periods when the video display device no longer operates in the learning mode. A video display device may also accumulate digital video clip characteristics such as, for example, the length of the digital video text, the text speed for the digital video clip, and the display period for the digital video clip, while in a learning mode that may be utilized to calculate future pause periods when the video display device no longer operates in the learning mode. For further explanation, therefore, FIG. 12 sets forth a flow chart illustrating a further exemplary method for slowing display of digital video according to embodiments of the present invention that includes calculating (1212) a length of a pause period in dependence upon a clip characteristics history (1202).

Figure 12:
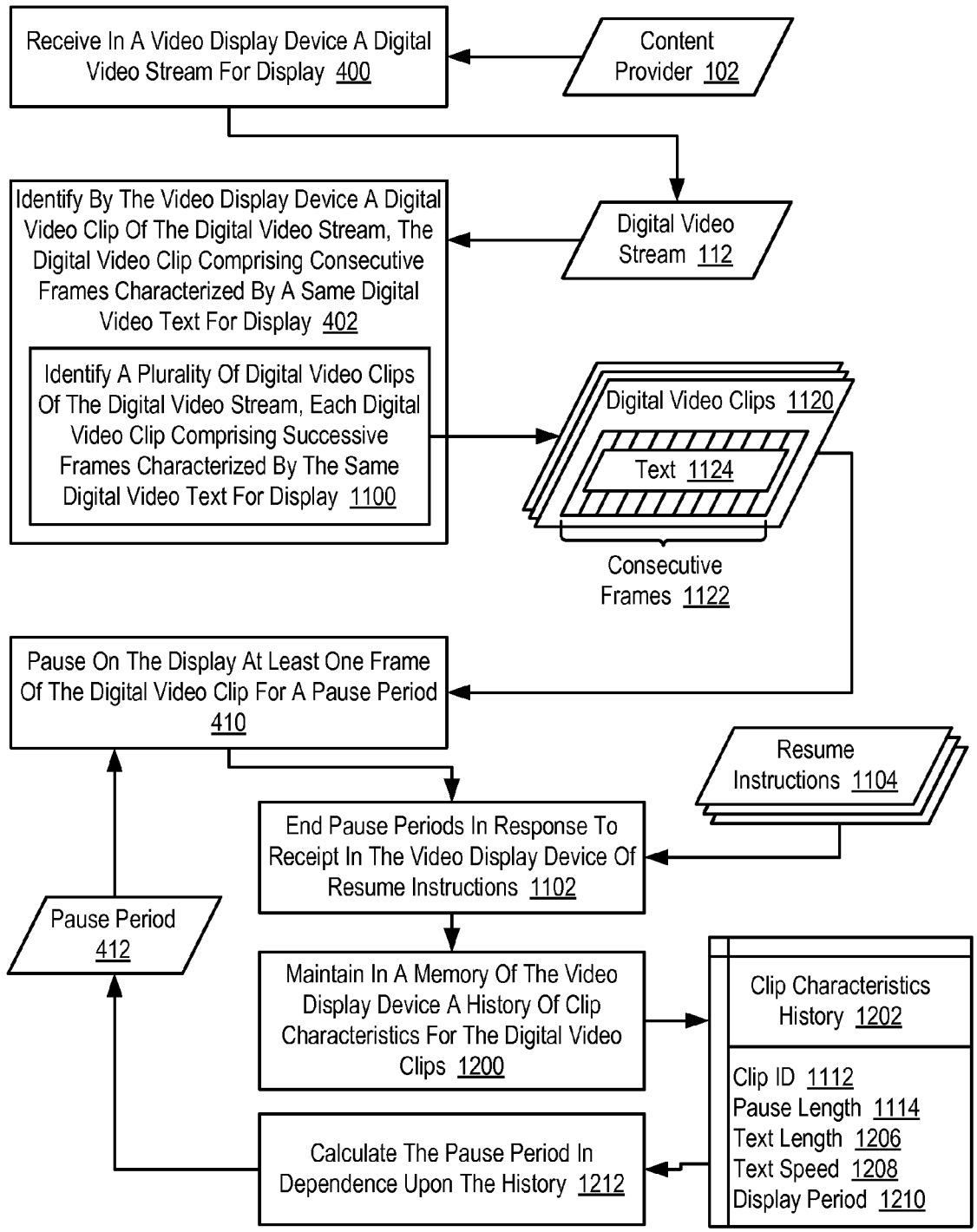
FIG. 12 sets forth a flow chart illustrating a further exemplary method for slowing display of digital video according to embodiments of the present invention.

The method of FIG. 12 is similar to the method of FIG. 4 in that the method of FIG. 12 includes receiving (400) in a video display device a digital video stream (112) for display, identifying (402) by the video display device a digital video clip (404) of the digital video stream (112), and pausing (410) on the display at least one frame of the digital video clip (404) for a pause period (412). The example of FIG. 12 is similar to the example of FIG. 4 in that the example of FIG. 12 also includes content provider (102), digital video stream (112), and the pause period (412).

The method of FIG. 12 differs from the method of FIG. 4 in that identifying (402) by the video display device a digital video clip of the digital video stream (112) according to the method of FIG. 12 includes identifying (1100) a plurality of digital video clips (1120) of the digital video stream (112). Each digital video clip (1120) includes consecutive frames (1122) characterized by the same digital video text (1124) for display. Identifying (1100) a plurality of digital video clips (1120) of the digital video stream (112) according to the method of FIG. 12 may be carried out by identifying by the video display device a digital video clip of the digital video stream (112) as discussed above with reference to FIG. 4.

The method of FIG. 12 also includes ending (1102) pause periods in response to receipt in the video display device of resume instructions (1104). The resume instructions (1104) represent instructions from users to resume normal display of the frame of the digital video stream according to a particular frame rate. Ending (1102) pause periods in response to receipt in the video display device of resume instructions (1104) according to the method of FIG. 12 may be carried out by pausing until the resume instruction is received by the video display device as described above with reference to FIG. 10.

The method of FIG. 12 also includes maintaining (1200) in a memory of the video display device a history (1202) of clip characteristics for the digital video clips. Clip characteristics include a length of the digital video text, a text speed for a digital video clip, and a display period for the digital video clip. The history (1202) of clip characteristics for the digital video clips is a table that associates a clip identifier (1112) with a text length (1206), a text speed (1208), and a display period (1210). Each record of the clip characteristic history (1202) table represents clip characteristics for a previously displayed digital video clip paused until the video display device received a resume instruction. The clip identifier (1112) specifies the particular digital video clip having a frame paused on a display. The pause length (1114) specifies the period of time for which display of the digital video stream is paused on a particular frame. The text length (1206) specifies the quantity of the text for display. The text speed (1208) specifies the rate at which the digital video text (408) is displayed for a digital video clip. The display period (1210) is the period of time taken to display the frames of a digital video clip at a particular frame rate. In the example of FIG. 12, maintaining (1200) in a memory of the video display device a history (1202) of clip characteristics for the digital video clips may be carried out by associating, for each pause period ended in response to receipt in the video display device of a resume instruction (1004), an identifier for the clip that includes the frame on which the display is paused with clip characteristics and the pause length of the digital video clip.

At some point during the operation of the video display device, a user may switch the video display device out of learning mode so that the video display device calculates the pause periods based on a the clip characteristics history (1202) instead of the calculating the pause period based on the receipt of a resume instruction. The method of FIG. 12, therefore, also includes calculating (1212) a length of a pause period in dependence upon the history (1202). Calculating (1212) a length of a pause period in dependence upon the history (1202) according to the method of FIG. 12 may be carried out by calculating a length of a pause period for a current digital video clip for display as the average pause length for digital video clips having similar clip characteristics in the clip characteristic history (1202) table, calculating a length of a pause period for a current digital video clip for display as the weighted average of the pause length for digital video clips having similar clip characteristics, or calculating (1212) a length of a pause period in dependence upon the history (1202) in any other way as will occur to those of skill in the art. Calculating (1212) a length of a pause period in dependence upon the history (1202) advantageously slows the display of digital video by adapting the pause period according to the historical pause length for digital video clips having similar text lengths, text speeds, display periods, and so on.

Users utilizing video display devices operating according to embodiments of the present invention may at times choose to turn off the automatic pausing features of the device. While the automatic pausing features described above are turned off, several scenes of a movie or a television show implemented using a digital video stream may be displayed in rapid succession. The user often does not have time to read the digital video text displayed on the screen because of the increased text speed for the last few digital video clips containing the scenes rapidly displayed. In such a situation, the user may desire to rewind the digital video stream for playback at the point where the text speed increased. For further explanation, therefore, FIG. 13 sets forth a flow chart illustrating a further exemplary method for slowing display of digital video according to embodiments of the present invention that includes identifying (1310) a digital video clip (1314) for playback in dependence upon the identified text accelerations (1306).

Figure 13:
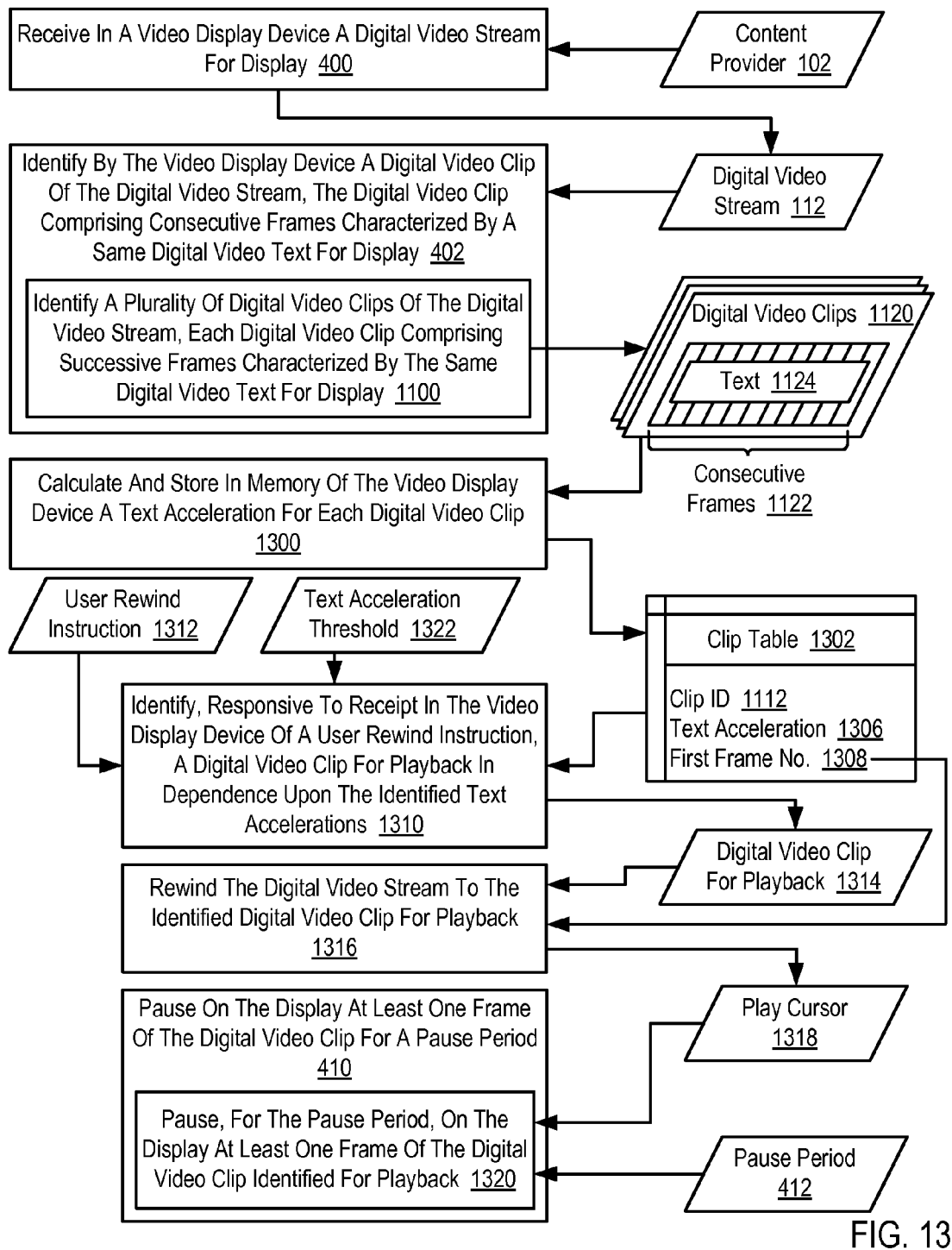
FIG. 13 sets forth a flow chart illustrating a further exemplary method for slowing display of digital video according to embodiments of the present invention.

The method of FIG. 13 is similar to the method of FIG. 4 in that the method of FIG. 13 includes receiving (400) in a video display device a digital video stream (112) for display, identifying (402) by the video display device a digital video clip (404) of the digital video stream (112), and pausing (410) on the display at least one frame of the digital video clip (404) for a pause period (412). The example of FIG. 13 is similar to the example of FIG. 4 in that the example of FIG. 13 also includes content provider (102), digital video stream (112), and the pause period (412).

The method of FIG. 13 differs from the method of FIG. 4 in that identifying (402) by the video display device a digital video clip of the digital video stream (112) according to the method of FIG. 13 includes identifying (1100) a plurality of digital video clips (1120) of the digital video stream (112). Each digital video clip (1120) includes consecutive frames (1122) characterized by the same digital video text (1124) for display. Identifying (1100) a plurality of digital video clips (1120) of the digital video stream (112) according to the method of FIG. 13 may be carried out by identifying by the video display device a digital video clip of the digital video stream (112) as discussed above with reference to FIG. 4.

The method of FIG. 13 also includes calculating (1300) and storing in memory of the video display device a text acceleration (1306) for each digital video clip (1120). The text acceleration (1306) is a change in the rate of text speed between two consecutive digital video clips, a current clip and a previous clip. Calculating (1300) a text acceleration (1306) for each digital video clip (1120) according to the method of FIG. 13 may be carried out by calculating the text acceleration (1306) as the rate of the text speed of the current digital video clip minus the text speed of the previous digital video clip divided by one clip. Consider, for example, a current digital video clip for display having a text speed of thirty characters per second and the immediately preceding digital video clip having a text speed of twenty characters per second. Calculating the text acceleration (1306) as the rate of the text speed of the current digital video clip minus the text speed of the previous digital video clip divided by one clip may be carried out, for example, as follows:

$$A_0 = (S_0 - S_1) \div 1 \text{ clip}$$
$$= (30 \text{ characters per second} - 20 \text{ characters per second}) \div 1 \text{ clip}$$
$$= 10 \text{ characters per second per clip}$$

where $A_0$ is the text acceleration of the current digital video clip, $S_0$ is the text speed of the current digital video clip, and $S_1$ is the text speed of the previous digital video clip. Readers will note that the exemplary calculation above is for explanation only and not for limitation. In fact, calculating (1300) a text acceleration (1306) for each digital video clip (1120) may be carried out in other ways as will occur to those of skill in the art.

Storing in memory of the video display device a text acceleration (1306) for each digital video clip (1120) according to the method of FIG. 13 may be carried out by associating the text acceleration (1306) with a clip identifier (1112) in a clip table (1302). The clip table (1302) is a table that associates a clip identifier (1112) with the text acceleration (1306) and a first frame number (1308). Each row in the clip table (1302) represents a digital video clip already displayed or currently being displayed. The clip identifier (1112) specifies the particular digital video clip having a frame paused on a display. The first frame number (1308) represents the beginning frame of the digital video clip. That is, the first frame of a digital video clip is the first frame of the clip identified from a digital video stream. The first frame number (1308) may be stored as a frame identifier for the first frame or a pointer to a memory location containing a portion of the image data or metadata of the first frame of the clip.

The method of FIG. 13 also includes identifying (1310), responsive to receipt in the video display device of a user rewind instruction (1312), a digital video clip (1314) for playback in dependence upon the identified text accelerations (1306). The rewind instruction (1312) represents an instruction from a user to rewind the digital video stream (112) to a particular digital video clip for playback where the text speed the digital video clips began to increase. In the method of FIG. 13, identifying (1310) a digital video clip (1314) for playback in dependence upon the identified text accelerations (1306) may be carried out by traversing through the clip table (1302) from the most recently displayed clips to the least recently displayed clips, comparing the text acceleration (1306) for each clip with a text acceleration threshold (1322), an identifying a digital video clip for playback if the text acceleration of the clip exceeds the text acceleration threshold (1322). The text acceleration threshold (1322) is threshold value set in the video display device by the manufacturer or user of a video display device that is used to determined whether or not the change in text speed between the current clip and the previous clip is significant enough for a user to want to see the digital video text for the clip again. Although identifying (1310) a digital video clip (1314) for playback in dependence upon the identified text accelerations (1306) may be carried out using a text acceleration threshold (1322), other ways of identifying (1310) a digital video clip (1314) for playback in dependence upon the identified text accelerations (1306) as will occur to those of skill in the art may also be useful in slowing display of digital video according to embodiments of the present invention.

The method of FIG. 13 also includes rewinding (1316) the digital video stream (112) to the identified digital video clip (1314) for playback. Rewinding (1316) the digital video stream (112) to the identified digital video clip (1314) for playback may be carried out by storing the first frame number (1308) of the digital video clip identified for playback (1314) in a play cursor (1318). The play cursor (1318) is location in computer memory of the video display device containing the frame identifier or a pointer to the memory location of the frame currently being displayed on a display screen.

In the example of FIG. 13, pausing (410) on the display at least one frame of the digital video clip (404) for a pause period (412) includes pausing (1320), for the pause period (412), on the display at least one frame of the digital video clip (1314) identified for playback. Pausing (1320), for the pause period (412), on the display at least one frame of the digital video clip (1314) identified for playback according to the method of FIG. 13 may be carried out by pausing on the display at least one frame of the digital video clip (404) for a pause period according to any of the methods described above with reference to the other Figures.

Exemplary embodiments of the present invention are described largely in the context of a fully functional computer system for slowing display of digital video. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

In view of these explanations, readers will recognize that slowing display of digital video according to embodiments of the present invention provides, among others, the following benefits:

Large quantities of text appearing on a display screen results in pausing or slowing down of a video stream without user intervention to provide a user time to read all of the text.

Text rapidly appearing on a display screen results in pausing or slowing down of a video stream without user intervention to provide a user time to read all of the text.

A user may simply push a single rewind button to automatically rewind the video stream to a point where a fast flow of text began and to pause or slow down the video stream at that particular point.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of slowing display of digital video, the method comprising:

receiving in a video display device a digital video stream for display;

identifying by the video display device a digital video clip of the digital video stream, the digital video clip comprising consecutive frames characterized by a same digital video text for display; and pausing on the display at least one frame of the digital video clip for a pause period;

establishing a text length threshold;

identifying a length of the digital video text; and calculating the pause period in dependence upon the length of the digital video text;

wherein pausing on the display at least one frame of the digital video clip for the pause period further comprises pausing on the display at least one frame of the digital video clip for the pause period only if the identified length of the digital video text exceeds the text length threshold.

2. A method of slowing display of digital video, the method comprising:

receiving in a video display device a digital video stream for display;

identifying by the video display device a digital video clip of the digital video stream, the digital video clip comprising consecutive frames characterized by a same digital video text for display; and pausing on the display at least one frame of the digital video clip for a pause period;

establishing a text speed threshold;

identifying a text speed of the digital video clip; and calculating the pause period in dependence upon the text speed of the digital video clip;

wherein pausing on the display at least one frame of the digital video clip for the pause period further comprises pausing on the display at least one frame of the digital video clip for the pause period only if the identified text speed of the digital video clip exceeds the text speed threshold.

3. A method of slowing display of digital video, the method comprising:

receiving in a video display device a digital video stream for display;

identifying by the video display device a digital video clip of the digital video stream, the digital video clip comprising consecutive frames characterized by a same digital video text for display; and pausing on the display at least one frame of the digital video clip for a pause period, wherein the digital video stream comprises frames having more than one set of digital video text available for display, the sets varying in verbosity;

identifying a text length for each set of digital video text of the frames in the digital video clip; and selecting, for the digital video clip, a set of digital video text for display in dependence upon the identified text lengths.

4. A method of slowing display of digital video, the method comprising:

receiving in a video display device a digital video stream for display;

identifying by the video display device a digital video clip of the digital video stream, the digital video clip comprising consecutive frames characterized by a same digital video text for display; and pausing on the display at least one frame of the digital video clip for a pause period, wherein identifying a digital video clip of the digital video stream further comprises identifying a plurality of digital video clips of the digital video stream, each digital video clip comprising consecutive frames characterized by the same digital video text for display;

ending pause periods in response to receipt in the video display device of resume instructions;

maintaining in a memory of the video display device a history of lengths of the pause periods; and calculating the pause period in dependence upon the history.

5. A method of slowing display of digital video, the method comprising:

receiving in a video display device a digital video stream for display;

identifying by the video display device a digital video clip of the digital video stream, the digital video clip comprising consecutive frames characterized by a same digital video text for display; and pausing on the display at least one frame of the digital video clip for a pause period, wherein identifying a digital video clip of the digital video stream further comprises identifying a plurality of digital video clips of the digital video stream, each digital video clip comprising consecutive frames characterized by the same digital video text for display;

ending pause periods in response to receipt in the video display device of resume instructions;

maintaining in a memory of the video display device a history of clip characteristics for the digital video clips, the clip characteristics comprising a length of the digital video text, a text speed for a digital video clip, and a display period for the digital video clip; and calculating a length of a pause period in dependence upon the history.

6. A method of slowing display of digital video, the method comprising:

receiving in a video display device a digital video stream for display;

identifying by the video display device a digital video clip of the digital video stream, the digital video clip comprising consecutive frames characterized by a same digital video text for display; and pausing on the display at least one frame of the digital video clip for a pause period, wherein identifying a digital video clip of the digital video stream further comprises identifying a plurality of digital video clips of the digital video stream, each digital video clip comprising consecutive frames characterized by the same digital video text for display;

calculating and storing in memory of the video display device a text acceleration for each digital video clip;

identifying, responsive to receipt in the video display device of a user rewind instruction, a digital video clip for playback in dependence upon the identified text accelerations; and rewinding the digital video stream to the identified digital video clip for playback;

wherein pausing on the display at least one frame of the digital video clip for a pause period further comprises pausing, for the pause period, on the display at least one frame of the digital video clip identified for playback.

7. An apparatus for slowing display of digital video, the apparatus comprising a computer processor, a computer memory operatively coupled to the computer processor, the computer memory having disposed within it computer program instructions capable of:

receiving in a video display device a digital video stream for display;

identifying by the video display device a digital video clip of the digital video stream, the digital video clip comprising consecutive frames characterized by a same digital video text for display;

pausing on the display at least one frame of the digital video clip for a pause period;

establishing a text length threshold;

identifying a length of the digital video text; and calculating the pause period in dependence upon the length of the digital video text;

wherein pausing on the display at least one frame of the digital video clip for the pause period further comprises pausing on the display at least one frame of the digital video clip for the pause period only if the identified length of the digital video text exceeds the text length threshold.

8. A computer program product for slowing display of digital video, the computer program product disposed upon a non-transitory, computer readable storage medium, the computer program product comprising computer program instructions capable of:

receiving in a video display device a digital video stream for display;

identifying by the video display device a digital video clip of the digital video stream, the digital video clip comprising consecutive frames characterized by a same digital video text for display;

pausing on the display at least one frame of the digital video clip for a pause period;

establishing a text length threshold;

identifying a length of the digital video text; and calculating the pause period in dependence upon the length of the digital video text;

wherein pausing on the display at least one frame of the digital video clip for the pause period further comprises pausing on the display at least one frame of the digital video clip for the pause period only if the identified length of the digital video text exceeds the text length threshold.

9. A computer program product for slowing display of digital video, the computer program product disposed upon a non-transitory, computer readable storage medium, the computer program product comprising computer program instructions capable of:

receiving in a video display device a digital video stream for display;

identifying by the video display device a digital video clip of the digital video stream, the digital video clip comprising consecutive frames characterized by a same digital video text for display;

pausing on the display at least one frame of the digital video clip for a pause period, wherein identifying a digital video clip of the digital video stream further comprises identifying a plurality of digital video clips of the digital video stream, each digital video clip comprising consecutive frames characterized by the same digital video text for display;

calculating and storing in memory of the video display device a text acceleration for each digital video clip;

identifying, responsive to receipt in the video display device of a user rewind instruction, a digital video clip for playback in dependence upon the identified text accelerations; and rewinding the digital video stream to the identified digital video clip for playback;

wherein pausing on the display at least one frame of the digital video clip for a pause period further comprises pausing, for the pause period, on the display at least one frame of the digital video clip identified for playback.

* * * * *